(12) United States Patent
Oishi et al.

(10) Patent No.: US 6,276,136 B1
(45) Date of Patent: Aug. 21, 2001

(54) HYDRAULIC PRESSURE BRAKE APPARATUS

(75) Inventors: Masaki Oishi; Michiharu Nishii; Hideki Yamamoto, all of Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/493,109

(22) Filed: Jan. 28, 2000

(51) Int. Cl.$^7$ ..................................................... B60T 13/00
(52) U.S. Cl. ........................................ 60/547.1; 303/114.1
(58) Field of Search .................................. 60/547.1, 549, 60/555, 560; 303/113.3, 114.1, 193

(56) References Cited

U.S. PATENT DOCUMENTS

| | | | |
|---|---|---|---|
| 3,877,756 | * | 4/1975 | Inada et al. ......................... 303/114.1 |
| 4,305,624 | * | 12/1981 | Belart et al. ................... 303/114.1 X |
| 4,768,842 | * | 9/1988 | Ogino et al. ....................... 303/114.1 |
| 4,815,793 | * | 3/1989 | Reinartz et al. .................. 303/113.3 |
| 4,832,418 | * | 5/1989 | Mattusch ............................ 303/114.1 |
| 4,914,917 | * | 4/1990 | Schonlau ............................ 303/113.4 |
| 5,531,509 | * | 7/1996 | Kellner et al. ..................... 303/114.1 |
| 6,183,049 | * | 2/2001 | Oka et al. .......................... 303/114.1 |

* cited by examiner

Primary Examiner—John E. Ryznic
(74) Attorney, Agent, or Firm—Burns, Doane, Swecker & Mathis, LLP

(57) ABSTRACT

To provide an improved braking feeling in a hydraulic brake apparatus, the apparatus includes a pressure source, and a regulator for regulating pressure in the pressure source to a regulated pressure corresponding to the operation force of the brake pedal to supply the regulated pressure to a power chamber during operation of the brake pedal. The regulator includes a pressure increasing valve which establishes and interrupts a fluid communication between the pressure source and the power chamber and a pressure decreasing valve which establishes and interrupts a fluid communication between the power chamber and a reservoir. The apparatus also includes a booster having a power piston operated by the regulated pressure in the power chamber, and a master cylinder associated with at least one wheel brake and interlocked with the booster. A valve member applies the pressure in the pressure source to the power chamber irrespective of operation of the brake pedal. The valve member includes a first valve establishing and interrupting a fluid communication between the power chamber and the pressure decreasing valve and a second valve establishing and interrupting a fluid communication between the power chamber and the pressure source.

19 Claims, 13 Drawing Sheets

HYDRAULIC PRESSURE BRAKE APPARATUS

This application is based on and claims priority under 35 U.S.C. §119 with respect to Japanese Application No. 11(1999)-19861 filed on Jan. 28, 1999, the entire content of which is incorporated herein by reference.

FIELD OF THE INVENTION

The present invention generally relates to a brake pressure apparatus for a vehicle. More particularly, the present invention pertains to a hydraulic pressure brake apparatus which provides braking forces to the respective wheels of an automotive vehicle.

BACKGROUND OF THE INVENTION

A conventional hydraulic pressure brake apparatus generally includes a brake pedal, a master cylinder having a cylinder body formed therein with a cylinder bore and a piston slidably fitted in the cylinder body in such a manner that the piston is moved during depression of the brake pedal and with a pressure chamber being defined in the cylinder bore at the front side of the piston, a plurality of wheel brakes in fluid communication with the pressure chamber to provide braking forces to the respective wheels when a fluid under pressure is applied to the wheel brakes as a result of the depression of the brake pedal, an accumulator for accumulating a high-pressure brake fluid, a first valve for establishing and interrupting fluid communication between the accumulator and the wheel brakes, and a second valve for establishing and interrupting fluid communication between the brake chamber of the master cylinder and the wheel brakes.

This conventional brake apparatus includes two brake operation modes, a normal brake operation mode and an automatic brake operation mode. The normal brake operation mode involves supplying braking pressure generated in the brake chamber of the master brake cylinder to the wheel brakes when the brake pedal is depressed. The automatic brake operation mode involves supplying pressure in the accumulator to the wheel brakes irrespective of operation of the brake pedal by establishing fluid communication between the accumulator and the wheel brakes and interrupting fluid communication between the brake chamber of the master cylinder and the wheel brakes.

In addition, if the brake pedal is depressed while the brake apparatus is in the automatic brake operation mode, the wheel brakes are brought into fluid communication with the pressure chamber by the second valve so that in addition to the pressure in the accumulator applied to each wheel brake, the master cylinder pressure is applied to each wheel brake.

However, in this conventional brake apparatus, to obtain a braking pressure in the wheel brakes when the brake pedal is depressed during the automatic brake operation mode which is substantially equivalent to the braking pressure in the wheel brakes when the brake apparatus is in the normal operation mode, the amount of brake pedal depression (i.e., the brake pedal stroke) is smaller than that in the normal operation mode. These two different amounts of brake pedal depression for obtaining two equivalent or substantially equal braking forces may not provide a good braking feeling.

In light of the foregoing, a need exists for a hydraulic pressure brake apparatus which is able to provide a good braking feeling without the foregoing drawback.

SUMMARY OF THE INVENTION

In light of the foregoing, one aspect of the invention involves a hydraulic brake apparatus that includes a pressure source, a regulator for regulating pressure in the pressure source to a regulated pressure corresponding to the operation force of the brake pedal to supply the regulated pressure to a power chamber during operation of the brake pedal, a booster and a master cylinder. The regulator includes a pressure increasing valve which establishes and interrupts a fluid communication between the pressure source and the power chamber and a pressure decreasing valve which establishes and interrupts a fluid communication between the power chamber and a reservoir. The booster ha a power piston operated by the regulated pressure in the power chamber, and the master cylinder is associated with at least one wheel brake and interlocked with the booster. A valve member applies the pressure in the pressure source to the power chamber irrespective of operation of the brake pedal. The valve member includes a first valve establishing and interrupting a fluid communication between the power chamber and the pressure decreasing valve and a second valve establishing and interrupting a fluid communication between the power chamber and the pressure source.

According to another aspect of the invention, a hydraulic pressure brake apparatus includes a pressure source, a regulator that regulates pressure in the pressure source to a regulated pressure corresponding to the operation force of a brake pedal to supply the regulated pressure to a power chamber during operation of the brake pedal, a booster and a master cylinder. The regulator includes a pressure increasing valve which alternatively establishes and interrupts fluid communication between the pressure source and the power chamber and a pressure decreasing valve which alternatively establishes and interrupts fluid communication between the power chamber and a reservoir. The booster includes a power piston operated by the regulated pressure in the power chamber, and the master cylinder is associated with at least one wheel brake and is interlocked with the booster. The master cylinder has a master cylinder piston adapted to be interlocked with the power piston, and a pressure chamber defined between the master cylinder piston and the power piston. A valve mechanism applies the pressure in the pressure source to the pressure chamber irrespective of operation of the brake pedal to operate the master cylinder piston. The valve mechanism includes a first valve alternatively establishing and interrupting fluid communication between the pressure chamber and the pressure decreasing valve and a second valve alternatively establishing and interrupting fluid communication between the pressure chamber and the pressure source.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
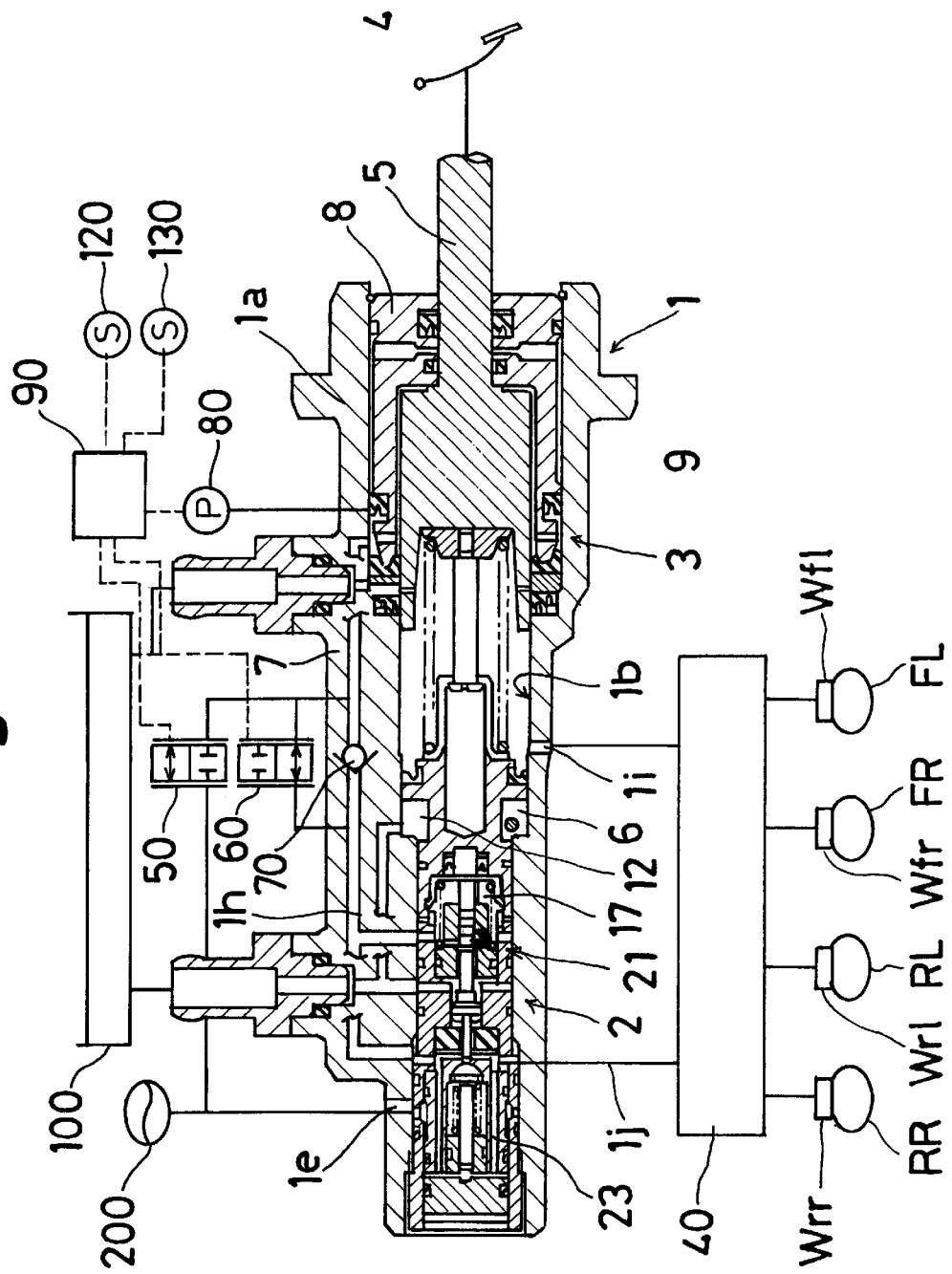
FIG. 1 is a vertical cross-sectional view of a brake apparatus in accordance with a first embodiment of the present invention.

Referring initially to FIG. 1, the hydraulic pressure brake apparatus 1 in accordance with a first embodiment of the present invention includes a hydraulic pressure cylinder body 1a. A hydraulic pressure regulator 2 is installed in the vehicle front side portion of the hydraulic pressure cylinder body 1a (i.e., the left side in FIG. 1), while a master cylinder 3 provided in association with a brake pedal 4 serving as a brake operation member is disposed in the vehicle rear side portion of the hydraulic pressure cylinder body 1a (i.e., the right side in FIG. 1).

When the brake pedal 4 is depressed, the resultant force serving as a braking operation force is transmitted to a piston 5 which acts as a master cylinder piston and a power piston. The corresponding output fluid pressure of the master cylinder 3 is transmitted, by way of an ABS, a TRC and an actuator 40 for the purpose of brake and steering control, to a plurality of wheel brakes or wheel cylinders Wfr, Wfl, Wrr, Wrl. The wheel brakes or wheel cylinders Wfr, Wfl, Wrr, Wrl are operatively associated with the vehicle front-right wheel FR, the vehicle front-left wheel FL, the vehicle rear-right wheel RR, and the vehicle rear-left wheel RL, respectively. The wheel cylinders Wfr, Wfl belong to a first hydraulic pressure circuit, while the wheel cylinders Wrr, Wrl belong to a second hydraulic pressure circuit.

A stepped cylinder bore 1a is formed in the cylinder body 1a. The piston 5 and a control piston 6 are fitted in the stepped cylinder bore 1a in a slidable manner so as to be movable back and forth (i.e., in the right and left directions in FIG. 1). A pressure chamber 7 is defined between the piston 5 and the power piston 6, and is located at the frontward portion of the piston 5. A power chamber 9 is defined at the rearward portion of the piston 5 between the piston 5 and a plug 8 which closes a rear open end of the cylinder bore 1b.

Figure 2:
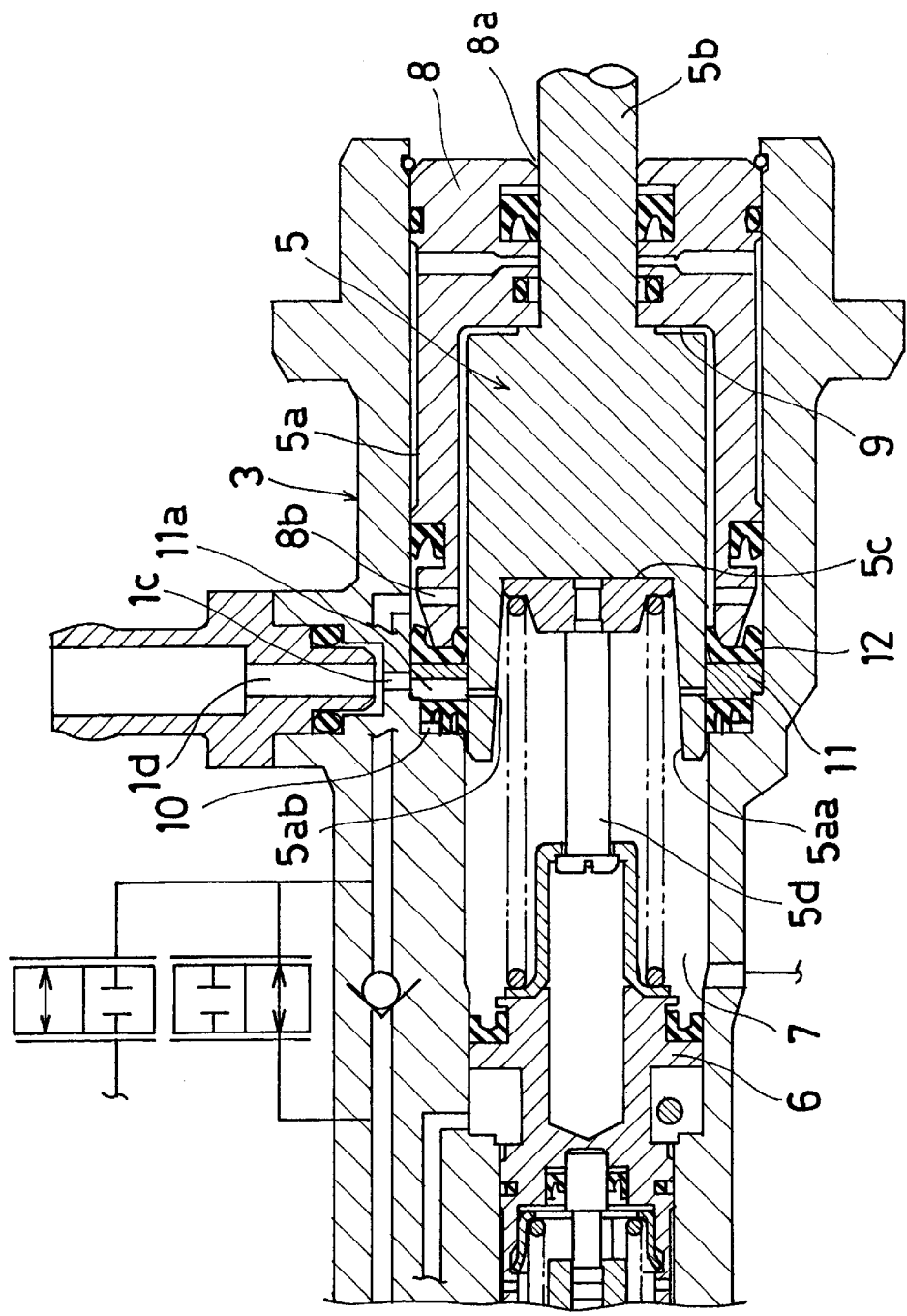
FIG. 2 is an enlarged vertical cross-sectional view of the master cylinder forming a part of the brake apparatus shown in FIG. 1.

As shown in FIG. 1 and FIG. 2, the plug 8 possesses a bottom walled recessed configuration and opens in the frontward direction (i.e., the leftward direction in FIGS. 1 and 2). Between the front end of the plug 8 and a stepped portion of the cylinder bore 1b, a sealing cup 10, a retainer 11, and a sealing cup 11 are arranged in that order from the frontward to the rearward.

The piston 5 is fitted in the recessed portion of the plug 8 and the cylinder bore 1b in a slidable manner so as to be movable back and forth. The piston 5 includes a main body 5a from which a shaft portion 5b extends in the rearward direction. The shaft portion 5b of the piston 5 passes through an aperture 8a formed in the bottom wall of the plug 8 in a fluid-tight manner and is connected to the brake pedal 4 after extending outside the cylinder body 1a. The piston 5 is interlocked with or connected to the brake pedal 4 so that the piston 5 and the brake pedal 4 move together. When the brake pedal 4 is depressed, the piston 5 moves in the frontward direction. Similarly, the piston 5 moves in the frontward direction is the brake pedal 4 is moved.

The outer surface of the main body 5a of the piston 5, the rightward end of the main body 5a, sealing cup 12, and the recessed or concave portion of the plug 8 define a power chamber 9. The sealing cup 10, the retainer 11, and the sealing cup 12 establish a fluid-tight isolation of the power chamber 9 from the pressure chamber 7. The power chamber 9 is in fluid communication with a hydraulic passage 1h by way of a port 8b formed in the plug 8. The port 8b extends in the radial direction.

A concave or recessed portion is provided at the frontward portion of the main body 5a of the piston 5. The recessed portion 5aa opens in the forward direction (i.e., the left direction in FIG. 2). The piston 5 is formed at its frontward portion with a communication hole 5ab which extends in the radial direction and establishes fluid communication between the outer and inner sides of the recessed portion 5aa. While the master cylinder 3 is in its initial state as shown in FIG. 2, the pressure chamber 7 is in fluid communication with a reservoir 100 by way of the concave portion 5aa of the piston 5, the communication port 5ab, a radially extending port 11a formed in the retainer 11, a hydraulic pressure passage 1c formed in the cylinder body 1a, and a port 1d.

A substantially circular plate 5a is fitted within the recessed portion 5aa of the piston 5. A separate shaft 5d extends from the substantially circular plate 5a in the frontward direction.

Figure 3:
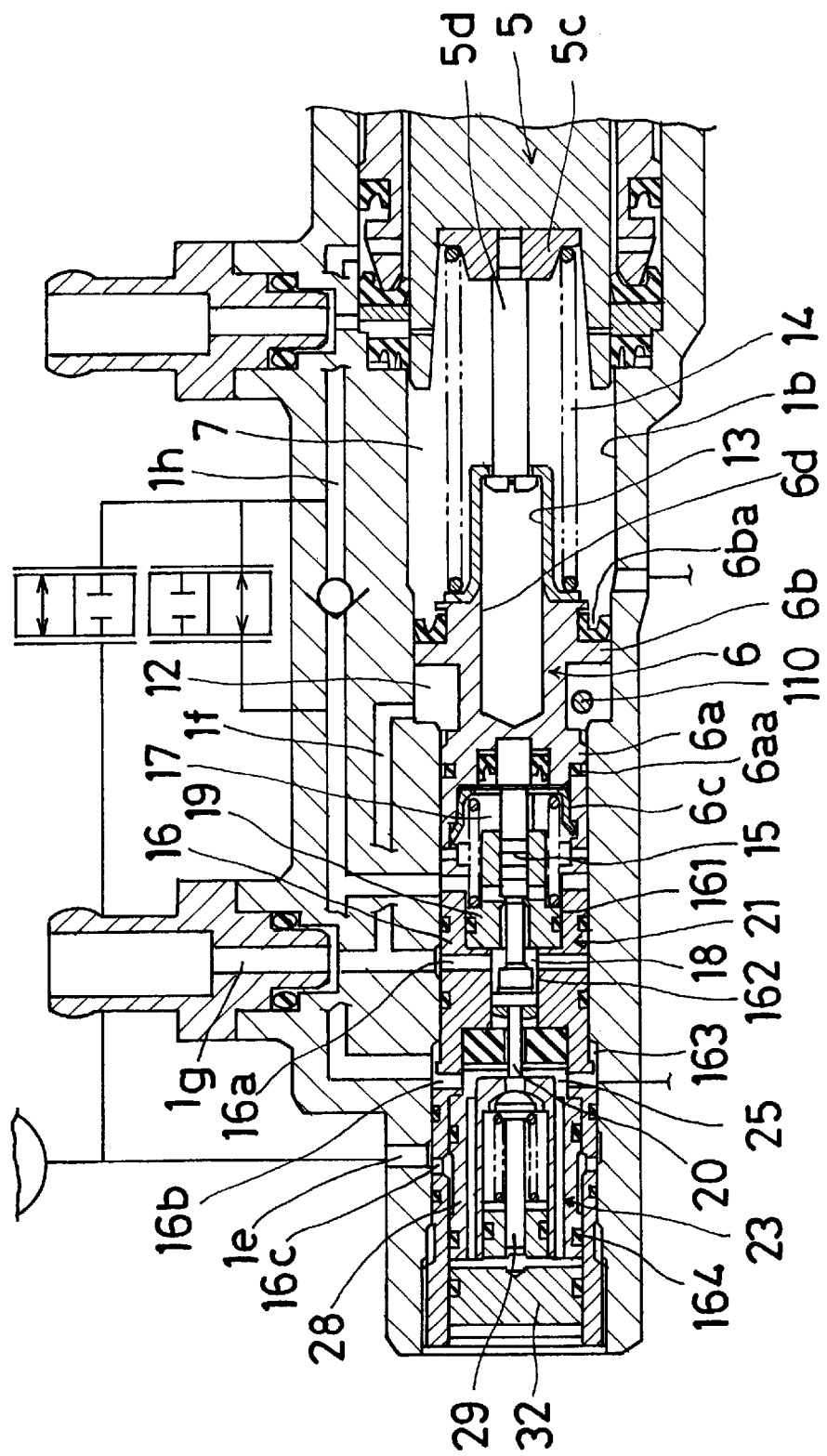
FIG. 3 is an enlarged vertical cross-sectional view of the hydraulic regulator portion of the brake apparatus shown in FIG. 1.

As shown in FIG. 1 and FIG. 3, the hydraulic pressure regulator 2 includes a spool valve mechanism 21 serving as a pressure decreasing means and a poppet valve mechanism 23 serving as a pressure increasing means, both of which are driven when the control piston 6 is moved. The hydraulic pressure regulator 2 is connected to an accumulator 200 for controlling the output pressure of the hydraulic pressure regulator 2. The accumulator 200 is also connected to another reservoir (not shown) by way of an electric-motor operated hydraulic pressure pump (not shown). A communication hole 16c is supplied with hydraulic power pressure delivered from the accumulator 200 by way of a hydraulic pressure passage 1e.

A pair of axially spaced land portions 6a, 6b is provided on the outer surface of the control piston 6 which is accommodated in the cylinder bore 1b. The rear land portion 6b possesses a larger radial dimension (e.g., diameter) than the front land portion 6a. A seal ring 6aa is provided on the front land portion 6a while a seal cup 6ba is provided on the rear land portion 6b. Thus, the control piston 6 is movable in the cylinder bore 1b in a fluid-tight manner.

A brake fluid supply chamber 12 is defined in the cylinder bore 1b and is enclosed by the outer surface of the control piston 6, the land portions 6a, 6b, and the inner surface of the cylinder bore 1b. The seal cup 6ba establishes a fluid-tight separation of the brake fluid supply chamber 12 from the pressure chamber 7, while the seal ring 6aa establishes a fluid-tight separation of the brake fluid supply chamber 12 from a regulating chamber 17. The brake fluid supply chamber 12 is in fluid communication with the reservoir 100 by way of a hydraulic pressure passage 1f and a communication port 1g.

The front end of the control piston 6 is formed with a front concave or recessed portion 6c and the rear end of the control piston 6 is formed with a rear concave or recessed portion 6d. A retainer 13 is provided at the rear end of the control piston 6. A coil spring 14 is interposed between the retainer 13 and the plate 5c to maintain a distance between the piston 5 and the control piston 6. An interlocking engagement between the retainer 13 and the front end of the separate shaft 5d regulates the rearward movement (i.e., the rightward movement in FIG. 3) of the piston 5. The rear end of a spool 15 is held in the front recessed portion 6c of the control piston 6.

Figure 4:
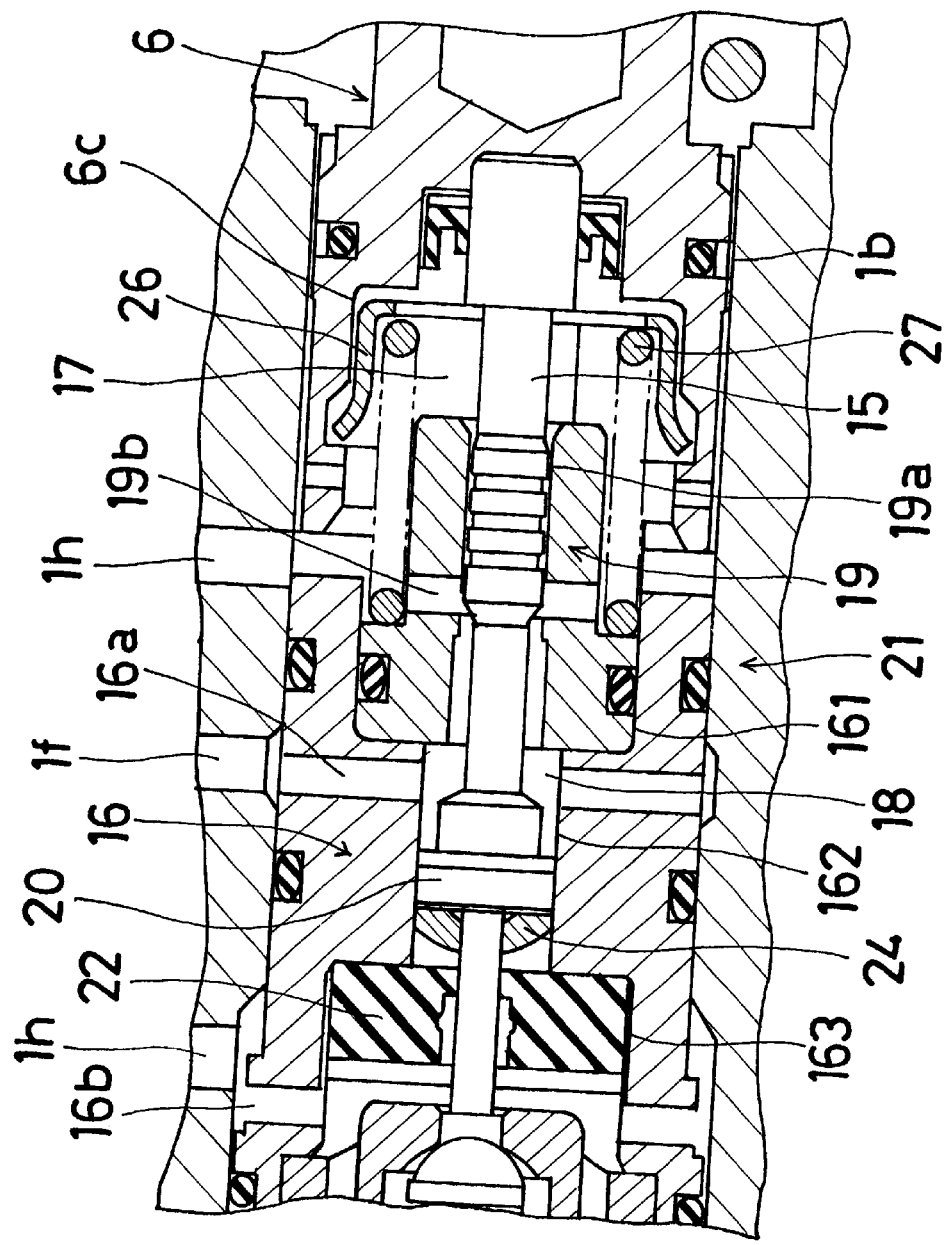
FIG. 4 is an enlarged vertical cross-sectional view of the sleeve valve mechanism forming a part of the brake apparatus shown in FIG. 1.

With reference to both FIG. 3 and FIG. 4, a sleeve 16 having a cylindrical configuration is snugly fitted in the cylinder bore 1b at the frontward portion of the control piston 6 (i.e., the leftward portion in FIG. 4). A plurality of annular grooves are formed on the outer surface of the sleeve 16. A sealing ring is snugly fitted into each of the grooves on the outer surface of the sleeve 16. Two radially extending communication holes 16a, 16b are formed in the sleeve 16. The seal ring located between the communication holes 16a, 16b ensures a fluid-tight separation between the two communication holes 16a, 16b. The sleeve 16 has an inner space or a hollow portion which is in fluid communication with the hydraulic pressure passages 1f, 1g by way of the communication holes 16a, 16b, respectively.

The regulating chamber 17 is defined between the rear end of the sleeve 16 and the front end of the control piston 6, and is in fluid communication with the power chamber 9 shown in FIG. 2 by way of the hydraulic pressure passage 1h.

The inner space or hollow portion of the sleeve 16 possesses a stepped bore structure and includes bores 161, 162, 163, 164 which are of different diameters. The bore 162 which is of the minimum diameter acts as a drain chamber 18 which is in fluid communication with the reservoir 100 by way of the communication hole 16a, the hydraulic pressure passage 1f, and the port 1g.

A sleeve 19 having a stepped bore 19a is fitted in the bore 161. A radially extending communication hole 19b is also formed in the sleeve 19 and forms an angle of 90 degrees relative to the axis of the stepped bore 19a. The communication hole 19b establishes fluid communication between the stepped bore 19a and the regulating chamber 17. The spool 15 is fitted in the stepped bore 19a in a slidable manner.

A plunger 20 is fitted in the bore 162 so as to be slidably movable in the axial direction (i.e., the right-and-left direction in FIG. 4). The rear end of the plunger 20 is in engagement with the front or distal end of the spool 15 of the spool valve mechanism 21.

A rubber-made elastic element or member 22 which is formed into a right cylinder structure is fitted in the bore 163. The front end of the plunger 20 extends into the poppet valve mechanism 23 after passing through the rubber-made elastic member 22. A transmitting member 24 is provided between the rear end of the plunger 20 and the rear side of the rubber-made elastic member 22. The front side of the rubber-made elastic member 22 is provided with a concave or recessed portion and is also provided with a plate so that hydraulic pressure is applied evenly on the front side of the rubber-made elastic member 22.

An intermediate portion of the spool 15 is in sliding engagement with an inner surface of the stepped bore 19a of the sleeve 19. The intermediate portion of the spool 15 is formed at its outer surface with a plurality labyrinth grooves. A retainer 26 is mounted on the rear end portion of the spool 15 in such a manner that the retainer 26 is accommodated in the front concave portion 6c of the control piston 6. A spring 27 is interposed between the retainer 26 and the sleeve 19 to establish continual contact of the rear end of the spool 15 with the bottom of the front concave portion 6c of the control piston 6.

At the portion where the spool 15 is fitted in the sleeve 19, the communication hole 19b is in continual fluid communication with the regulating chamber 17. Though the communication hole 19b is in fluid communication with the drain chamber 18 so long as the spool 15 remains in its initial state, the flow rate therebetween becomes smaller by the intermediate portion with the labyrinth grooves as the spool 15 moves in the frontward direction. Ultimately, the communication hole 19b is closed.

The drain chamber 18 is in fluid communication with the reservoir 100 by way of the communication hole 16a of the sleeve 16, the hydraulic pressure passage 1f, and the port 1g. Thus, while the spool 15 is in its initial state, the regulating chamber 17 is in fluid communication with the reservoir 100. As a result, the regulating chamber 17 is filled with the brake fluid under atmospheric pressure.

Figure 5:
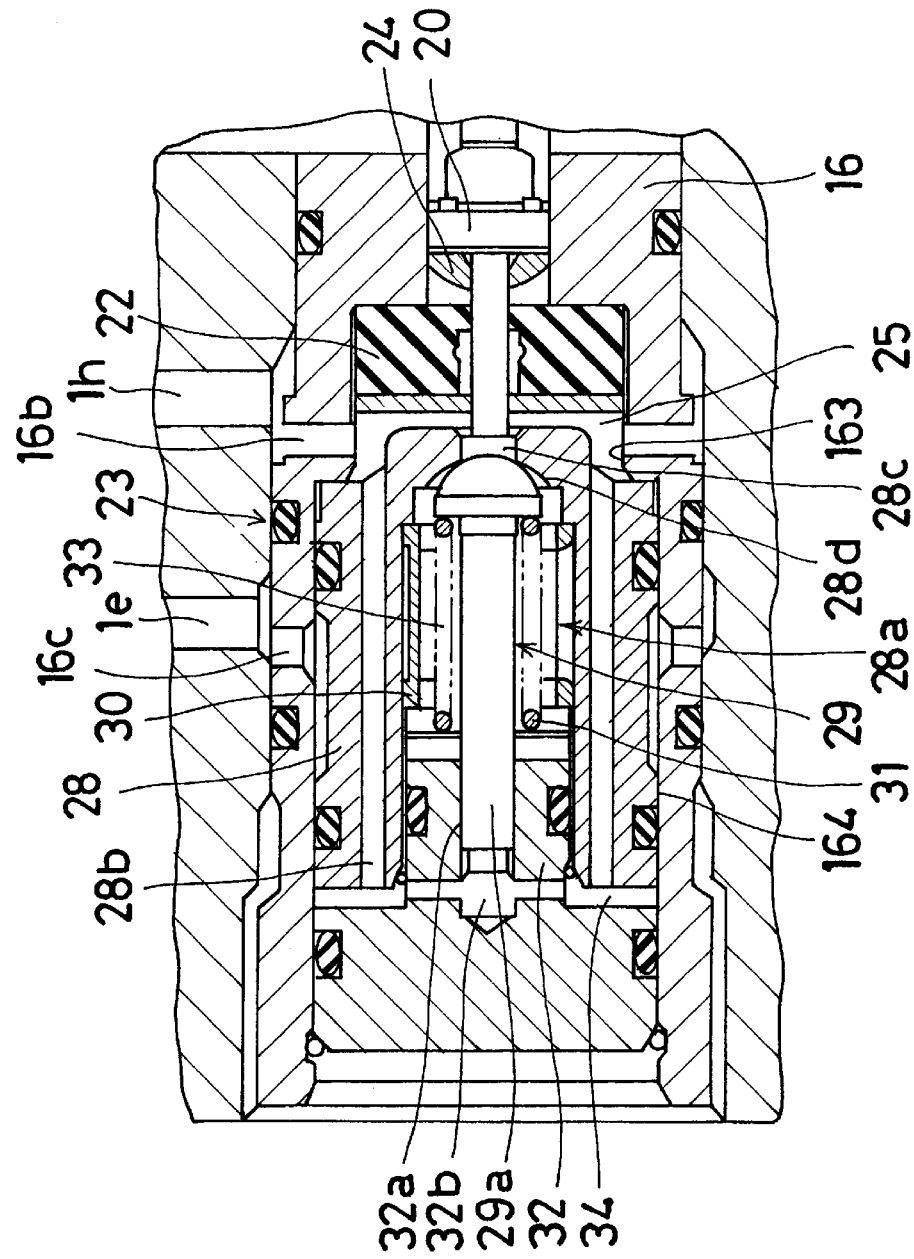
FIG. 5 is an enlarged vertical cross-sectional view of the poppet valve mechanism forming a part of the brake apparatus shown in FIG. 1.

Referring now to FIG. 3 and FIG. 5, a power output chamber 25 is defined between the rubber-made elastic member 22 in the bore 163 and the poppet valve mechanism 23. The power output chamber 25 is in fluid communication with the hydraulic pressure passage 1h by way of the communication hole 16b of the sleeve 16.

As can be seen in FIG. 1, the hydraulic pressure passage 1h is in fluid communication with the power chamber 9 which is also in fluid communication with the regulating chamber 17 by way of the hydraulic pressure passage 1h. This means that the power output chamber 25, the hydraulic pressure passage 1h, the power chamber 9, and the regulating chamber 17 constitute a pressure regulating device.

Referring back to FIG. 5, a sleeve 28 in the form of a bottom walled structure is installed in the bore 164. The sleeve 28 has an inner or hollow space 28a which extends in its axial direction (i.e., the right-and-left direction in FIG. 5) and a communication hole 28b which extends through the sleeve 28 parallel to the hollow space 28a. A communication hole 28c is formed in the bottom wall of the sleeve 28. The side of the communication hole 28c located adjacent the hollow space 28a is formed into a valve seat 28d. A plurality of annular grooves are formed in the outer surface of the sleeve 28, and a rubber-made sealing member is fitted into each of the grooves.

A valve body 29, a filter 30, and a spring 31 are accommodated in the hollow space 28a formed in the sleeve 28. A sleeve 32 having a stepped configuration is fitted in the hollow portion 28a of the sleeve 28, thus defining a power input chamber 33 in the hollow portion 28a of the sleeve 28. The power input chamber 33 is capable of being in fluid communication with the power output chamber 25 by way of the communication hole 28c.

The sleeve 32 is provided with an axial bore 32a which extends in the axial direction and a radially extending hole 32b which forms an angle of substantially 90 degrees relative to the axial bore 32b. The valve body 29 has an axial portion 29a which is supported in the axial bore 32a of the sleeve 32 in a slidable manner. It is to be noted that the opening area of the axial bore 32a is set to be substantially equal to the area which is defined when the valve body 28 sits on the valve seat 28d.

The valve member 29 is, together with the filter 30, accommodated in the hollow portion 28a of the sleeve 28. Immediately when the spring 31 is interposed between the rear end of the valve body 29 and the sleeve 32, the valve body 29 is urged toward the valve seat 28d. A smaller diameter portion of the sleeve 32 is then fitted in the hollow portion 28a of the sleeve 28.

At this time, a gap or clearance 34 is defined between the front end of the sleeve 28 and the rear end of the sleeve 32. The axial bore 32a is, by way of the gap 34 and the communication hole 28b of the sleeve 28, in fluid communication with the power output chamber 25 which is positioned at a top end side of the valve body 29a to be rested on the valve seat 28d. Thus, two substantially equivalent axial forces are applied to opposite ends of the valve body 29, which makes a load on the valve body 29 as small as possible. It is to be noted that at the initial state as shown in FIG. 5, a slight clearance is defined between the top end of the valve body 29a and the front end of the plunger 24.

When the brake apparatus 1 in its initial state as shown in FIGS. 1–5, the regulating chamber 17 is kept at atmospheric pressure due to the fact that the regulating chamber 17 is in fluid communication with the reservoir 100 by way of the communication holes 19a, 19b both of which are formed in the sleeve 19, the drain chamber 18, the communication hole 16a formed in the sleeve 16, the hydraulic pressure passage 1f, and the port 1g. When the spool 15 is advanced as a result of advancing movement of the control piston 6, the communication hole 19b of the sleeve 19 is closed by the spool 15 and concurrently the valve body 29 of the poppet valve mechanism 23 is opened.

Thus, the hydraulic power pressure or fluid under pressure which is derived from the accumulator 200 is supplied to the regulating chamber 17 by way of the hydraulic pressure passage 1e, the communication hole 16c, a hole (not shown) connecting between the communication hole 16c and the inner space 28a of the sleeve 28, the power input chamber 33, the clearance or gap between the valve body 29 and the valve seat 28d, the communication hole 28c of the sleeve 28, the power output chamber 25, the communication hole 16b and the hydraulic pressure passage 1h, and the power chamber 9 by the hydraulic pressure passage 1h. Thus, the pressure in each of the chambers is increased.

If the force or regulated hydraulic pressure acting on the front land portion 6a of the control piston 6 exceeds the master cylinder pressure acting on the rear land portion 6b of the control piston 6, the control piston 6 is brought into rearward movement, which concurrently closes and opens the valve body 29 of the poppet valve mechanism 23 and the spool 15 of the spool valve mechanism 21, respectively, with the result that the pressure in each of the regulating chamber 17, the power chamber 9, the power output chamber 25, and the hydraulic pressure passage 1h changes. Repetitively increasing and decreasing the pressure in each chamber causes the pressure in each chamber to be adjusted to the predetermined value.

Referring back to FIG. 1, the accumulator 200 is in fluid communication with the power chamber 9 by way of a normally closed type solenoid valve 50. In the hydraulic pressure passage 1h, there is provided a one-way valve 70 which only allows entrance of the brake fluid into the power chamber 9 from the regulating chamber 17 or the spool valve mechanism 21. The regulating chamber 17 or the spool valve mechanism 21 is also in fluid communication with the power chamber 9 by way of a normally open type solenoid valve 60. The solenoid valve 60 and the one-way valve 70 are arranged in parallel. The solenoid valve 60 and the solenoid valve 50 constitute a first solenoid valve and a second solenoid valve, respectively. Each of the solenoid valves 50, 60 is in the form of a linear control type solenoid valve, which makes it possible to change an opening degree of each of the solenoid valve 50, 60 in a linear mode fashion by adjusting the electric current applied to the solenoid valves 50, 60.

Figure 6:
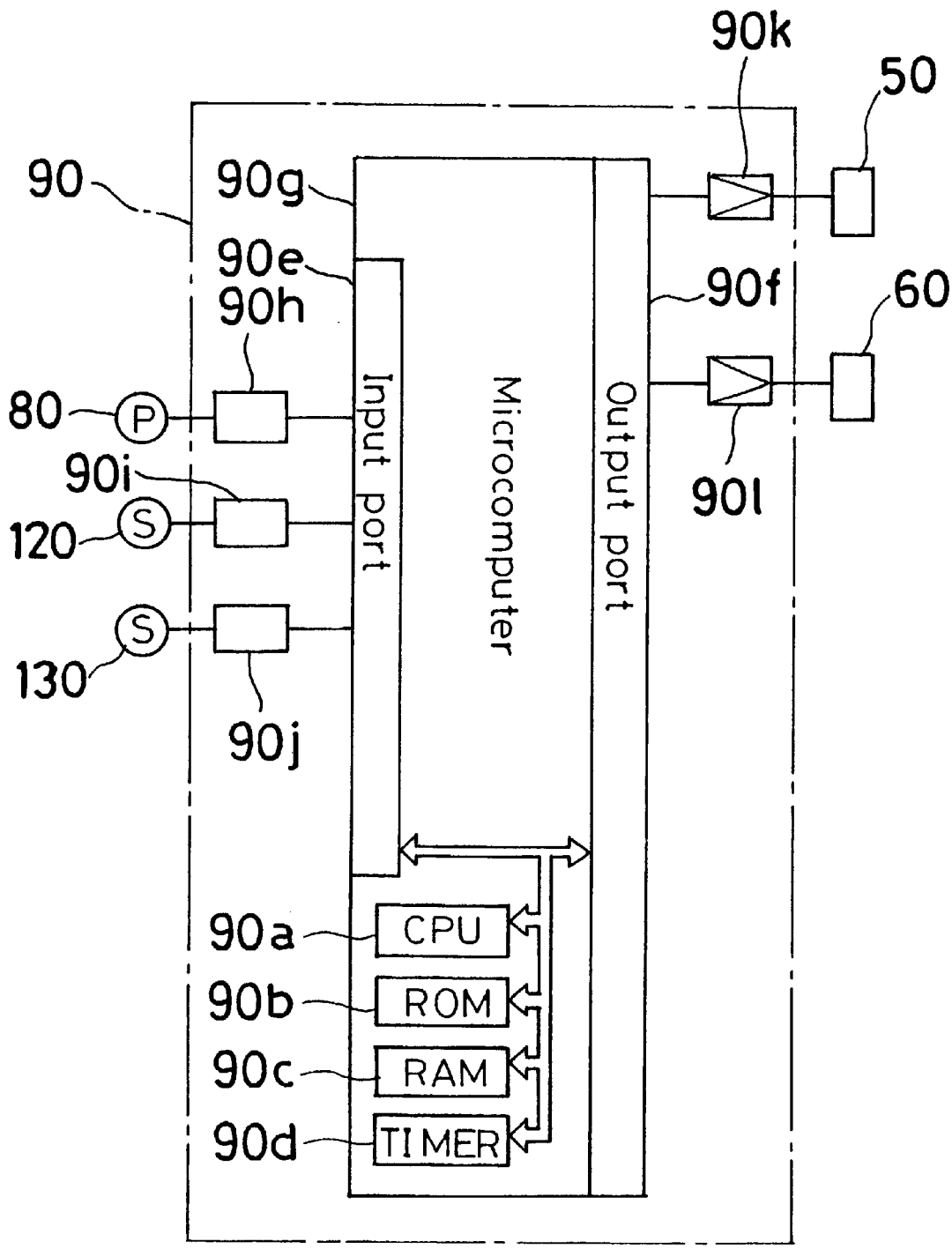
FIG. 6 is a schematic diagram of an electronic control device associated with the brake apparatus shown in FIG. 1.

The brake apparatus 1 is also equipped with a pressure sensor 80, an inter-vehicle distance sensor 120, and a speed meter 130 which are known to persons skilled in the art. The pressure sensor 80 is used to detect the pressure in the power chamber 9, the inter-vehicle distance sensor 120 determines the distance between a preceding vehicle and a following vehicle on which the brake apparatus 1 is mounted, and the speed sensor 130 is used to detect the current cruising speed of the following vehicle. The solenoid valves 50, 60, the pressure sensor 80, the inter-vehicle distance sensor 120 and the speed meter 130 are electrically wired to an electronic control device 90 which is shown in FIG. 6. The values measured or detected by the pressure sensor 80, the inter-vehicle distance sensor 120 and the speed meter 130 are fed to the electronic control device 90 as electronic or output signals.

Referring now to FIG. 6, the electronic control device 90 includes a microcomputer 90g provided with a CPU 90a, a ROM 90b, a RAM 90c, a timer 90d, an input port 90e, and an output port 90f. The output signal from the pressure sensor 80 is fed to the CPU 90a by way of an amplifying circuit 90h and the input port 90e, the output signal from the inter-vehicle distance sensor 120 is fed to the CPU 90a by way of an amplifying circuit 90i and the input port 90e, and the output signal from the speed sensor 130 is fed to the CPU 90a by way of an amplifying circuit 90j and the input port 90e. From the output port 90f, control signals are fed to the solenoid valves 50, 60 by way of amplifying circuits 90k, 90l, respectively.

In the microcomputer 90g, the ROM 90b stores a program whose sequential operations are based on flowcharts, the CPU 90a executes this program while an ignition switch is being turned on or closed, and the RAM 90c temporally stores data and/or variables which are required for executing the program.

Figure 7:
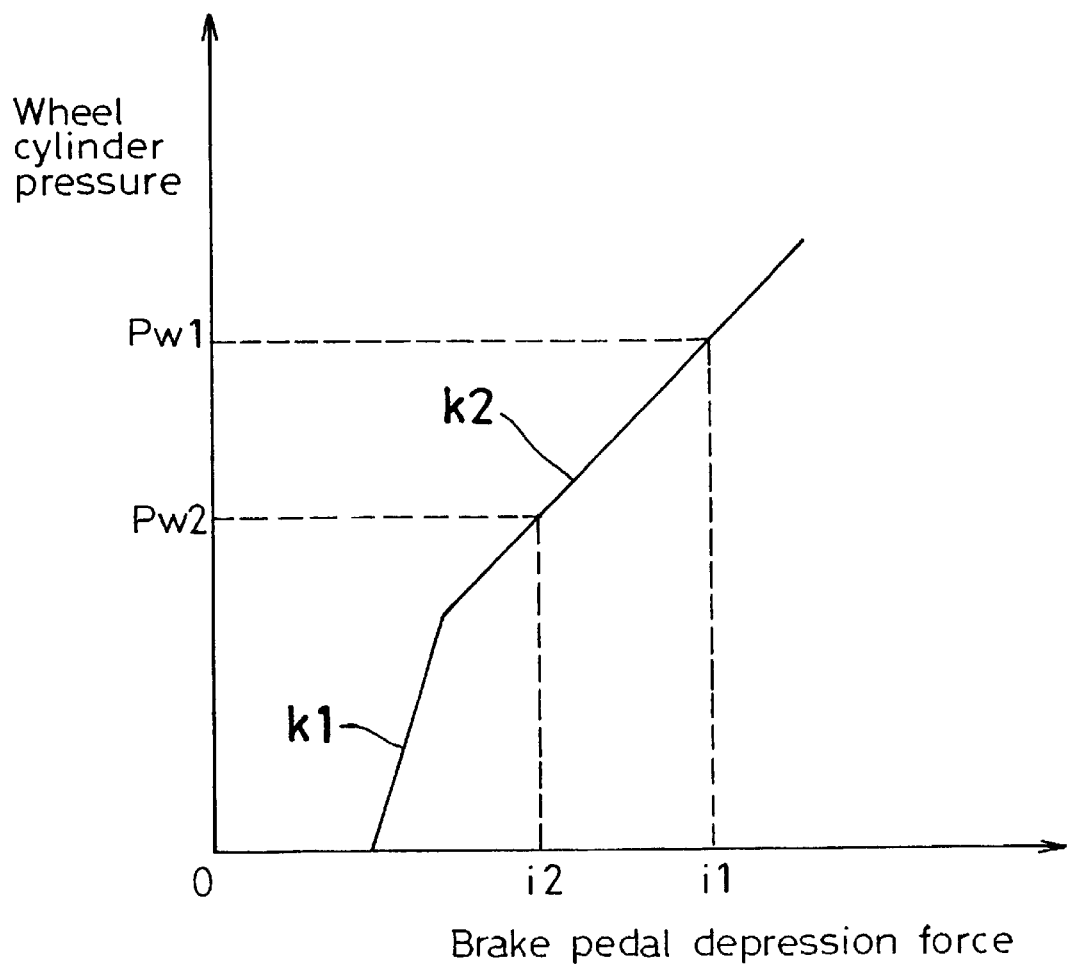
FIG. 7 is a graph indicating the relationship between the brake pedal depression force and the hydraulic pressure in a wheel cylinder in the first embodiment of the present invention.
Figure 8:
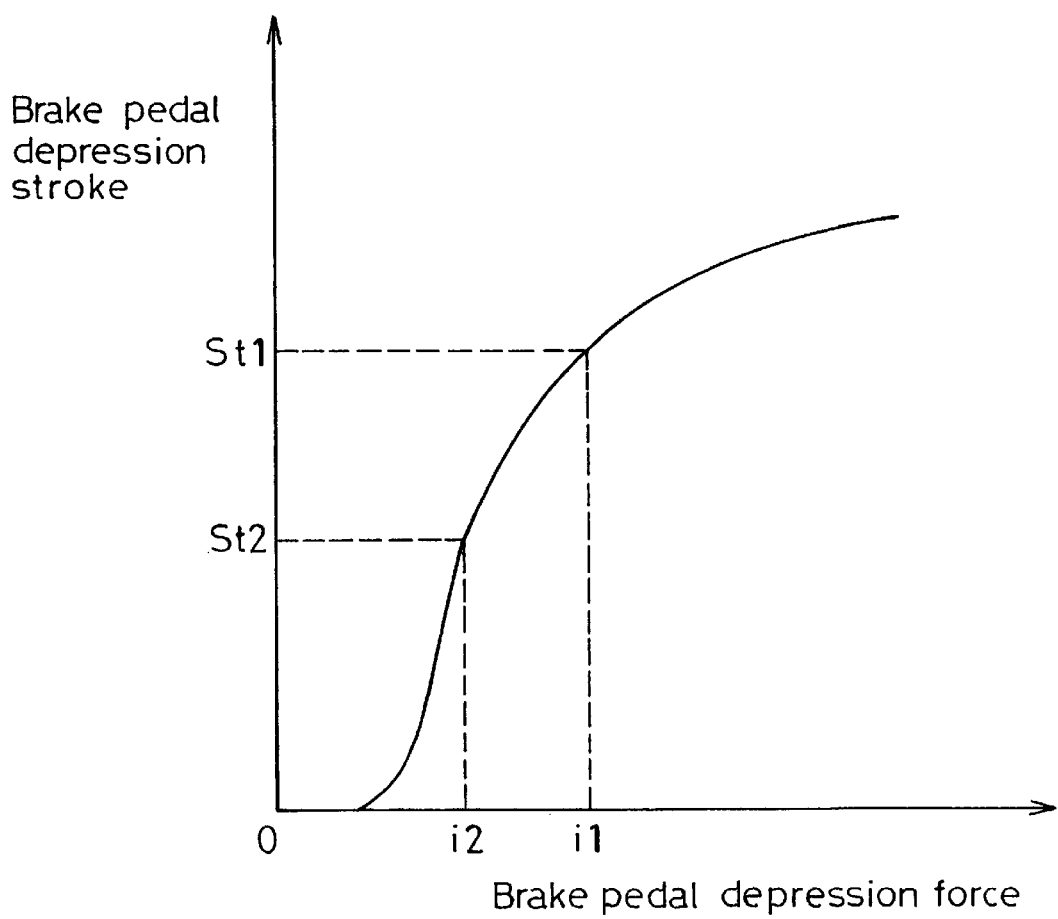
FIG. 8 is a graph indicating the relationship between the brake pedal depression force and the pedal depression stroke in the first embodiment of the present invention.
Figure 9:
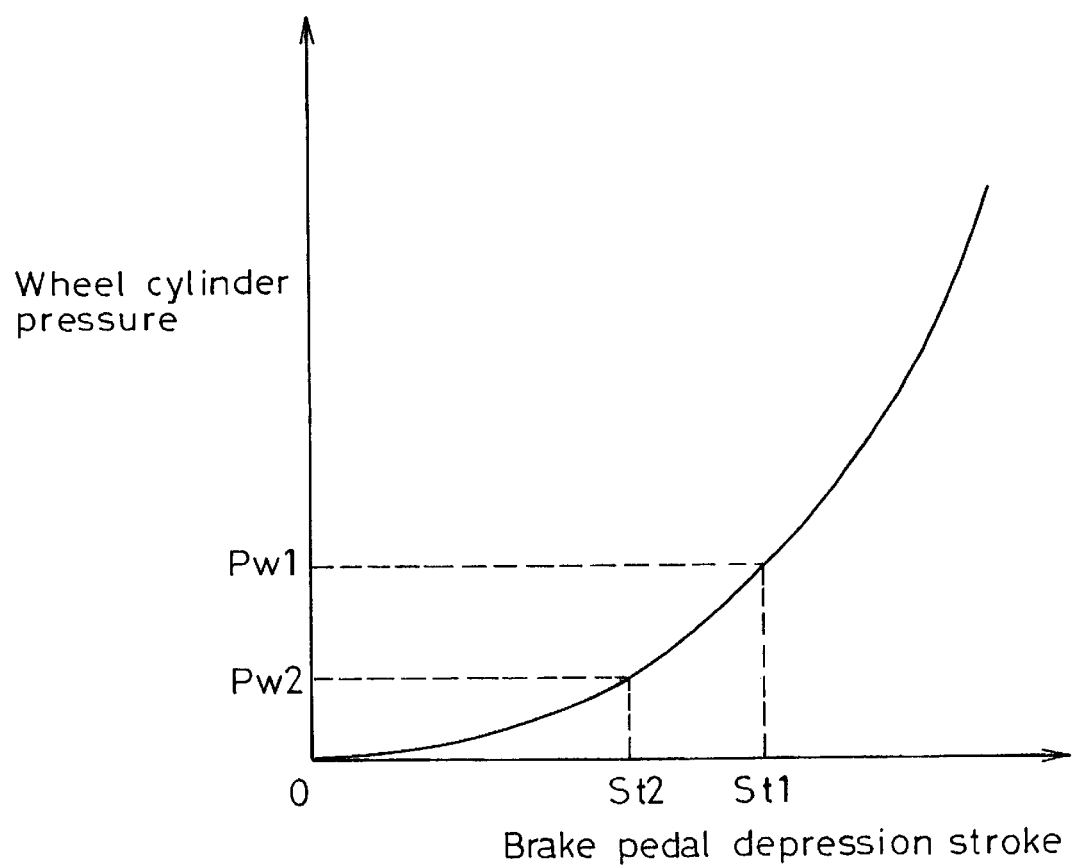
FIG. 9 is a graph indicating the relationship between the brake pedal depression stroke and the hydraulic pressure in a wheel cylinder in the first embodiment of the present invention.

The operation of the brake apparatus 1 in accordance with the first embodiment of the present invention will now be explained with reference to FIGS. 7–9 as well as FIGS. 1–6. FIG. 7 is a graph indicating a characteristic of the brake apparatus 1 in which the X-axis and the Y-axis represent the depression force transmitted from the brake pedal 4 when depressed and the hydraulic pressure in the front wheel side wheel cylinder Wfr (Wfl) respectively. FIG. 8 is a graph indicating another characteristic of the brake apparatus 1 in which the X-axis and the Y-axis represent the depression force transmitted from the brake pedal 4 when depressed and the brake pedal depression stroke, respectively. FIG. 9 is a graph indicating a still further characteristic of the brake apparatus 1 in which the X-axis and the Y-axis represent the brake pedal depression stroke and the hydraulic pressure in the front wheel side wheel cylinder Wfr (Wfl), respectively.

When the brake apparatus 1 is in its initial state, due to the fact that the solenoid valve 50 is in the closed condition, no fluid communication is established between the accumulator 200 and the power chamber 9 by way of the solenoid valve 50. On the other hand, the solenoid valve 60 is opened and so fluid communication is established between the power chamber 9 and the power output chamber 25 or the spool valve mechanism 21 by way of the solenoid valve 60.

When the ignition switch is turned on or closed, the electronic control device 90 begins to execute the program whose procedures are specified in the aforementioned flowcharts. Then, the microcomputer 90g is initialized, which clears the variables to zeros. During a normal braking operation mode, when the brake pedal 4 is applied with a depression force whose magnitude is i1 from a driver, the piston 5 is urged to thereby move the piston 5 in the frontward direction relative to the cylinder body 1a.

Due to the resultant frontward movement of the piston 5, the outside of the communication port 5ab is closed by the seal cup 10, which interrupts the fluid communication between the pressure chamber 7 and the reservoir 100. Thus, the fluid or hydraulic pressure in the pressure chamber 7 is increased in accordance with further frontward movement of the piston 5.

The resulting increase of the hydraulic pressure in the pressure chamber 7 moves the control piston 6 and the spool 15 in the frontward direction. This frontward movement of the spool 15 causes the outer surface of the spool 15 to close the inner side of the communication hole 19b of the sleeve 19, with the result that the fluid communication between the regulating chamber 17 and the reservoir 100 is cut off.

Simultaneously, the frontward movement of the spool 15 moves the plunger 20 and the valve body 29 in the frontward direction, with the result that the valve body 29 is moved away from the valve seat 28d. Then, the powered hydraulic pressure from the accumulator 200 is introduced into the regulating chamber 17 by way of the hydraulic pressure line 1e, the communication hole 16c, the power input chamber 33, the resultant clearance between the valve body 29 and valve seat 28d, the communication hole 28c, the power output chamber 25, the communication hole 16b, and the hydraulic pressure passage 1h. Also, the powered hydraulic pressure applied to the hydraulic pressure passage 1h is transmitted to the power chamber 9 by way of the solenoid valve 60, the check valve 70, and the communication hole 8b.

The hydraulic pressure applied to the power chamber 9 assists the piston 5 to move further in the frontward direction, which further increases the hydraulic pressure in the pressure chamber 7. The resulting or increased hydraulic pressure in the pressure chamber 7 is outputted, as a master cylinder hydraulic pressure, to the wheel cylinders Wfr, Wfl by way of the hydraulic pressure passage 1i and the actuator 40d, with the result that depending on the magnitude of the resulting hydraulic pressure, the wheel cylinders Wfr, Wfl apply braking forces to the wheels FR, FL, respectively. Thus, in accordance with the frontward movement of the piston 5 which is caused by the depression of the brake pedal 4, a first braking force is applied to each of the wheels FR, FL.

In addition, the powered hydraulic pressure is outputted from the power output chamber 25 to the wheel cylinders Wrr, Wrl by way of the hydraulic pressure passage 1j and the actuator 40, with the result that depending on the magnitude of the resulting powered hydraulic pressure, the wheel cylinders Wrr, Wrl apply braking forces to the wheels RR, RL, respectively. Thus, in accordance with the frontward movement of the piston 5 which is caused by the depression of the brake pedal 4, a first braking force is applied to each of the wheels RR, RL.

At this time, the magnitude of the hydraulic pressure applied to the front side wheel cylinders Wfr, Wfl is Pw1.

If the brake pedal 4 is released, the expanding forces of the respective springs 14 and 27 under compression move the piston 5 and the control piston 6 in the rearward direction to effect return movements of the piston 5 and the control piston 6. During such return movement of the control piston 6, the control piston 6 and the spool 15 move together relative to the cylinder body 1a. The return movement of the spool 15 releases the closure of the communication hole 19b by the spool 15 and simultaneously establishes closure of the communication hole 28c by the engagement of the valve body 29 with the valve seat 28d.

Thus, the regulating chamber 17 is isolated from the accumulator 200 and is brought into fluid communication with the reservoir 100 simultaneously, which interrupts fluid communication between the power output chamber 25 and the power input chamber 33 which is in continual fluid communication with the reservoir 200. The hydraulic pressure in each of the regulating chamber 17, the power chamber 9 and the pressure chamber 7 is decreased, with the result that the braking force applied to the wheels FR, FL, RR, RL is also decreased. The return movement of the control piston 6 is terminated immediately when the front land portion 6a of the control piston 6 is brought into engagement with the pin 110.

As for the piston 5, the returning movement of the piston 5 releases the closure of the communication hole 5ab caused by the seal cup 10. That is, the pressure chamber 7 is brought into fluid communication with the reservoir 100. The resulting fluid communication between the pressure chamber 7 and the reservoir 100 decreases the hydraulic pressure in the pressure chamber 7, which engages the shaft portion 5d of the piston 5 with retainer 13, thereby terminating the return movement of the piston 5.

The brake pedal 4 is returned to its initial position or state through the assistance of a spring (not shown) and the returning movement of the piston 5 to its initial state or position.

While the master cylinder 3 and the regulator 2 are in operation as a result of the depression of the brake pedal 4, if the hydraulic pressure applied to the control piston 6 from the regulating chamber 17 is smaller than the hydraulic pressure applied to the control piston 6 from the pressure chamber 7, the spool 15 of the spool valve mechanism 21 is closed, which moves the control piston 6 so that the valve body 29 of the poppet valve mechanism 23 opens, with the result that the hydraulic pressure in the regulating chamber 17 and the power chamber 9 is increased, respectively.

By contrast, if the hydraulic pressure applied to the control piston 6 from the regulating chamber 17 is larger than the hydraulic pressure applied to the control piston 6 from the pressure chamber 7, the spool 15 of the spool valve mechanism 21 is opened, which moves the control piston 6 so that the valve body 29 of the poppet valve mechanism 23 closes. As a result, the hydraulic pressure in the regulating chamber 17 and the power chamber 9 is decreased, respectively.

Due to the fact that the hydraulic pressure regulator 2 controls the hydraulic pressure in both the regulating chamber 17 and the power chamber 9 on the basis of or depending on the master cylinder hydraulic pressure, and the hydraulic pressure in the pressure chamber 7 depends on the depression force applied to the brake pedal 4 when depressed, the hydraulic pressure regulator 2 operates to control, depending on the depression force applied to the brake pedal 4, the hydraulic pressure introduced into the power chamber 9 and the regulating chamber 17 from the accumulator 200.

Thus, a control is carried out to equalize the regulating hydraulic pressure and the master cylinder hydraulic pressure acting on the opposite ends of the control piston 6, respectively, by repeating the movement of the spool 15 caused by movements of the control piston 6.

Furthermore, when the hydraulic pressure in the power output chamber 25 is increased, the resulting or increased hydraulic pressure moves the central portion of the elastic member 22 in the rearward direction, which brings an engagement of the elastic member 22 with the plunger 20, with the result that spool 15 is urged in the rearward direction, thereby increasing the opening area of the communication hole 19b. Thus, the regulating hydraulic pressure in the regulating chamber 17 is decreased, with the result that a hydraulic braking characteristic is obtained which, as apparent from the line k2 depicted in FIG. 7, is substantially in proportion to the master cylinder hydraulic pressure but is slightly smaller than an increasing hydraulic braking pressure character in slope.

In the foregoing hydraulic pressure brake apparatus 1, a relationship between the depression force applied to the brake pedal 4 and the depression stroke of the brake pedal 4 follows the curve depicted in FIG. 8. When the depression force applied to the brake pedal 4 is i1 and i2, the depression stroke of the brake pedal 4 is St1 and St2, respectively.

In addition, a relationship between the depression stroke of the brake pedal 4 and the hydraulic pressure in the front side wheel cylinder Wfr (Wfl) follows the curve depicted in FIG. 9. When the depression stroke of the brake pedal 4 is St1 and St2, the hydraulic pressure in the front side wheel cylinder Wfr (Wfl) is Pw1 and Pw2, respectively.

For example, while the vehicle is in cruise, if a measured value K1 which is detected by the inter-vehicle distance sensor 120 is inputted to the electronic control device 90, the measured value or distance K1 is compared to a predetermined or threshold value Kn in the electronic control device 90.

If the measured distance K1 is found to be smaller than the threshold value Kn in the electronic control device 90, to avoid approaching the preceding vehicle too closely, the electronic control device 90 begins establishing an automatic braking operation mode causing an increase in the inter-vehicle distance not less than the threshold value Kn by activating the solenoid valves 50, 60. That is, without depressing the brake pedal 4, the hydraulic pressure brake apparatus 1 is initiated.

When the electronic control device 90 activates the solenoid valve 50, the accumulator 200 is brought into fluid communication with the power chamber 9 by way of the open solenoid valve 50, and when the electronic control device 90 activates the solenoid valve 60, the power chamber 9 is isolated from the power output chamber 25, the spool valve mechanism 21,and the regulating chamber 17. Thus, the brake fluid in the accumulator 200 enters the power chamber 9, which increases the hydraulic pressure in the power chamber 9, with the result that the piston 5 is moved in the frontward direction, thereby applying a second braking force to each wheel substantially similar to the foregoing normal braking operation mode.

Thus, independent of the depression of the brake pedal 4, the hydraulic powered braking force derived from the accumulator 200 moves the piston 5 in the frontward direction, thereby applying the second braking force to each of the wheels FR, FL, RR, RL.

The electronic control device 90 calculates an ideal deceleration which is required for making the inter-vehicle distance not less than the threshold value Kn on the basis of the results of the inter-vehicle distance sensor 120 and the vehicle speed sensor 130. In order to apply braking forces to the wheels FR, FL, RR, RL which are essential for realizing the ideal deceleration, the amount of current applied to the solenoid valve 50 for adjusting the degree of opening is controlled. This results in an adjustment of the hydraulic powered braking pressure applied from the accumulator 200 to the power chamber 9.

If the result K2 issued most recently from the inter-vehicle sensor 120 is found to be longer than the threshold value Kn after being compared to the threshold value Kn, the current inter-vehicle distance is regarded as sufficient, thereby deactivating the solenoid valve 50. That is, the solenoid valve 50 is turned off or closed, thus resulting in interruption of the fluid communication between the accumulator 200 and the power chamber 9.

The electronic control device 90 calculates another ideal deceleration which is required for terminating the automatic braking operation mode in order to attain the calculated deceleration, the braking force applied to each of the wheels FR, FL, RR, RL is decreased. This pressure decrease is made by adjustment of the hydraulic pressure in the power chamber 9 by controlling the opening area of the solenoid valve 60 which results from adjusting the amount of current to be applied to the solenoid valve 60.

When the solenoid valve 60 is opened, the power chamber 9 is brought into fluid communication with the spool valve mechanism 21 and the regulating chamber 17, which allows the piston 5, biased by the spring 14, to retract. Then, the hydraulic braking fluid under pressure flows from the power chamber 9, by way of the hydraulic pressure passage 1h and the solenoid valve 60, into the spool valve mechanism 21 and the regulating chamber 17, which results in the hydraulic braking pressure in the power chamber 9 being decreased. Thus, similar to the foregoing return movement of the piston 5 in the normal braking operation mode, the piston 5 is returned to its initial position or state by being urged by the spring 14. As a result, the braking force applied to each of the wheels FR, FL, RR, and RL is decreased.

Immediately when the sensor 80 indicates that the hydraulic powered braking pressure in the power chamber 9 becomes substantially zero, the electronic control device 90 turns off the solenoid valve 60, which returns the hydraulic pressure brake apparatus 1 to its initial state.

The foregoing automatic braking operation mode applies the hydraulic braking pressure to move the piston 5 in the frontward direction so as to initiate or operate the hydraulic pressure brake apparatus 1 by using the accumulator 200 as a replacement of the driver's depression of the brake pedal 4.

While the automatic braking operation mode is being established, the relationship between the hydraulic powered braking pressure from the accumulator 200 to the power chamber 9 and the hydraulic braking pressure in the front side wheel cylinder Wfr/Wfl substantially follows the bent line depicted in FIG. 7. Thus, when the power chamber 9 is applied with the hydraulic powered braking pressure from the accumulator 200 which is equivalent to the depression force i1 applied to the brake pedal 4, the hydraulic pressure brake apparatus 1 applies hydraulic pressure having a magnitude of substantially Pw1 to the wheel cylinders Wfr, Wfl.

In addition, due to the fact that the brake pedal 4 is interlocked with the piston 5, while the automatic braking operation mode is being established, movement of the piston 5 in the forward direction causes the concurrent movement of the brake pedal 4 from its initial position. That is, while the automatic braking operation mode is being established, the relationship between the stroke of the brake pedal 4 from its initial position and the hydraulic powered braking force applied to the power chamber 9 from the accumulator 200 follows a curve which is substantially similar to the curve depicted in FIG. 8. Thus, if the hydraulic powered braking force equivalent to the depression force i1 applied to the brake pedal 4 is applied from the accumulator 200 to the power chamber 9, the brake pedal 4 is moved through a stroke or distance of St1.

As is apparent from the above description, in the automatic braking operation mode, the relationship between the stroke of the brake pedal 4 measured from its initial position and the hydraulic braking pressure in the front side wheel cylinder Wfr/Wfl follows a curve which is substantially similar to the curve depicted in FIG. 9. Thus, in the case where the stroke of the brake pedal 4 equals St1, the hydraulic braking pressure in the wheel cylinder Wfr/Wfl becomes about Pw1.

While the hydraulic pressure brake apparatus 1 is in operation in the automatic braking operation mode, if the hydraulic braking pressure applied to the front side wheel cylinder Wfr/Wfl is Pw2, for example, the brake pedal 4 moves through a distance or stroke of substantially St2 together with frontward movement of the piston 5.

Under the resulting condition, if the brake pedal 4 is depressed by the driver with a force whose magnitude is, for example, (i2−i1) in order to increase the braking force, the piston 5 is moved in the frontward direction relative to the cylinder body 1a. Due to the fact that the piston 5 has been moved in the forward direction already in the automatic brake operation mode, the pressure chamber 7 is isolated from the reservoir 100. Thus, the hydraulic pressure in the pressure chamber 7 is increased.

Increasing the hydraulic pressure in the pressure chamber 7 closes and opens the spool valve mechanism 21 and the poppet valve mechanism 23, respectively, and the power chamber 9 is brought into fluid communication with the accumulator 200. At this time, due to the fact that the automatic brake operation mode closes the solenoid valve 60, the hydraulic powered braking pressure is applied from the power chamber 9 by way of the power input chamber 33, the power output chamber 25, the hydraulic pressure passage 1h, and the check valve 70.

Thus, further forward movement of the piston 5 occurs, the hydraulic braking pressure in the pressure chamber 7 is further increased, the master cylinder hydraulic pressure is applied to the wheel cylinders Wfr, Wfl by way of the hydraulic pressure passage 1i, and the wheel cylinders Wrr, Wrl are applied with the hydraulic powered braking pressure from the power output chamber 25 by way of the hydraulic pressure chamber 1j. The wheels cylinders Wfr, Wfl, Wrr, Wrl, depending on the forces applied thereto, apply the brake forces to the respective wheels FR, FL, RR, RL.

In other words, the wheels FR, FL, RR, RL which are being applied with the respective second brake force by the automatic brake operation mode, are additionally applied with the respective first brake forces by the normal brake operation.

At this time, the piston 5 is applied with, as its promoting force, a sum of the depression force (i1−i2) from the driver and the hydraulic powered braking pressure whose magnitude is equivalent to the depression force i2. This means that such a condition is equivalent to the situation when the depression force i1 is applied to the brake pedal 4 when the apparatus is in the normal brake operation mode. Thus, the front side wheel cylinders Wfr, Wfl are applied with the hydraulic brake force whose magnitude is Pw1.

In this operation, the brake pedal 4 is further depressed through a stroke of (i1−i2) from a position at a distance of St2 from the initial position of the brake pedal 4, which results in that the stroke of the brake pedal 4 becomes St1 from its initial position. That is to say, in the normal brake operation mode, the brake pedal 4 has to be depressed through a stroke of St1 measured from its initial position so that the wheel cylinders Wfr, Wfl are applied with the hydraulic braking pressure whose magnitude is Pw1. By contrast, upon depression of the brake pedal 4 while the automatic brake operation mode is being established, the brake pedal 4 has to be depressed through a stroke of St1 measured from its initial position so that the wheel cylinders Wfr, Wfl are applied with the hydraulic braking pressure whose magnitude is Pw1.

Thus, if the same hydraulic braking pressure is applied to the wheel cylinder Wfr/Wfl in both the normal brake operation mode and the depression of the brake pedal during the automatic brake operation mode, the brake pedal 4 stops at the same position upon depression thereof which means that the depression stroke or the degree of depression of the brake pedal 4 becomes the same, which makes it possible to provide good brake feeling to the driver.

Adjusting the sealing ability of the seal cup 10 at its inner surface which is in sliding engagement with the outer surface of the piston 5 or a friction force between the inner surface of the seal cup 10 and the outer surface of the piston 5 enables an adjustment of the sliding resistance therebetween, which allows the hydraulic pressure brake apparatus 1 to control the hysteresis in the input-output characteristic, thereby providing a good brake control ability. For instance, decreasing the sealing ability of the seal cup 10 decreases hysteresis at the positive side of the input-output characteristic of the hydraulic pressure brake apparatus 1.

As explained above, if the same hydraulic braking pressure is applied to the wheel cylinder Wfr/Wfl in both the normal brake operation mode and the depression of the brake pedal during the automatic brake operation mode, the brake pedal 4 stops at the same position upon depression which means that the depression stroke or the degree of depression of the brake pedal 4 becomes the same, thus making it possible to provide a good brake feeling to the driver.

In addition, the solenoid valve 50 is in the form of a linear controlled type solenoid valve, which allows an easy hydraulic pressure control in the power chamber 9, with the result that the deceleration of the vehicle can be controlled in a relatively easy manner, thereby enabling excellent vehicle control when the hydraulic pressure brake apparatus 1 is operated in the automatic brake operation mode.

Moreover, upon depression of the brake pedal 4 while the hydraulic pressure brake apparatus 1 is being operated in the automatic brake operation mode, the check valve 70 makes it possible to establish an easy structure for establishing fluid communication between the power chamber 9 and each of the power output chamber 25 and the regulating chamber 17. This enables realization of cost reduction and improved productivity when the hydraulic pressure brake apparatus 1 is produced.

Furthermore, the piston 5 is so constructed as to act as both a master cylinder piston and a power piston. This allows the number of parts to be decreased, thereby enabling the cost reduction and easy assembly of the hydraulic pressure brake apparatus 1.

Moreover, the solenoid valves 50, 60 are designed to operate for reducing the inter-vehicle distance relative to the preceding vehicle less than a set value or according to the vehicle's condition, thereby making it possible to set an optimum turning-on time of each solenoid valve 50, 60.

In this embodiment, the piston 5 is designed to be both the master cylinder piston acting on the pressure chamber 7 of the master cylinder 2 and the booster power piston acting with the pressure in the power chamber 9, the invention is not limited to this structure. For example, in the foregoing hydraulic pressure brake apparatus 1, a separate master cylinder piston and booster power piston can be employed. In addition, a separate master cylinder and booster can also be employed.

Figure 10:
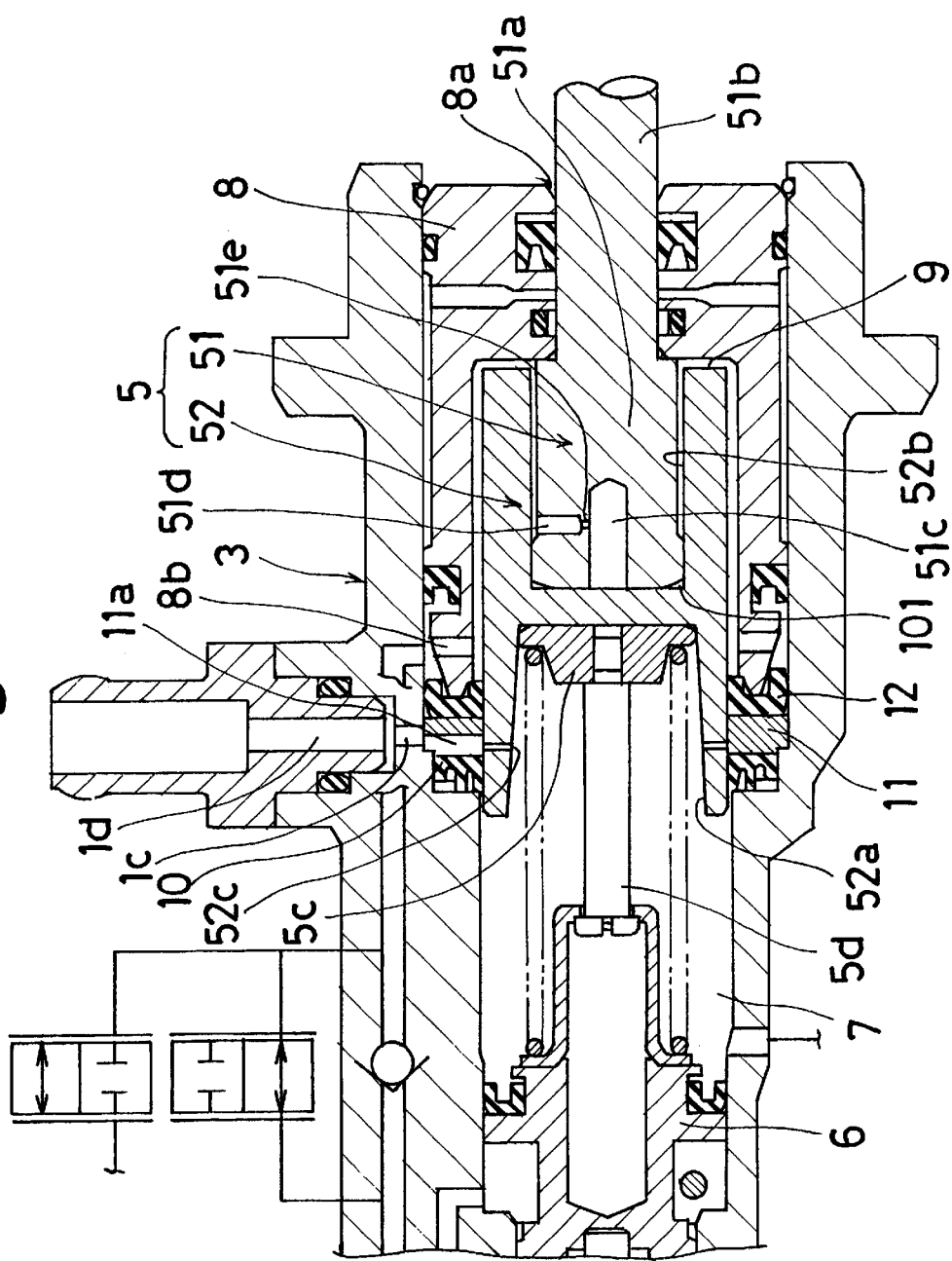
FIG. 10 is a vertical cross-sectional view of a master cylinder included in a brake apparatus in accordance with a second embodiment of the present invention.

FIG. 10 illustrates the master cylinder included in a hydraulic pressure brake apparatus 1 in accordance with a second embodiment of the present invention. The hydraulic pressure brake apparatus 1 in accordance with the second embodiment and the hydraulic pressure brake apparatus 1 in accordance with the first embodiment differ from one another with respect to the piston. The following description of the second embodiment will focus primarily upon the differences with respect to the first embodiment. Features in the second embodiment that correspond to those described above in connection with the first embodiment are provided with the same reference numerals.

A piston 5 which acts as a master cylinder piston and a power piston is fitted in a cylinder bore 1b and a concave portion of the plug 8 in slidable fashion so as to be movable in the axial direction (i.e., the right-and-left direction in FIG. 10). The piston 5 includes a first portion 51 and a second portion 52, with the second portion 52 being positioned at a frontward (i.e., the left side in FIG. 10) position of the first portion 51.

The first portion 51 of the piston 5 has a main part 51a and a shaft part 51b which extends from a rear side of the main part 51a in the rearward direction (i.e., the right direction in FIG. 10). The axial part 51b passes through an axial bore 8a formed in the plug 8 in a fluid-tight manner and is interlocked with a brake pedal (not shown) at a position outside the master cylinder body 1a. When the brake pedal is depressed, the first part 51a of the first portion 51 of the piston 5 is moved in the frontward direction. On the other hand, when the first part 51a of the first portion 51 of the piston 5 is moved, the brake pedal is concurrently operated.

The second portion 52 of the piston 5 has a front concave or recessed part 52a which opens in the frontward direction and a rear concave or recessed part 52b which opens in the rearward direction. The main part 51a of the first portion 51 of the piston 5 is fitted in the rear recessed part 52b so as to be slidable in the axial direction. Thus, one of the first portion 51 and the second portion 52 is movable relative to the other in the axial direction. At an initial state shown in FIG. 10, the front end of the first portion 51 is in abutment with the bottom surface of the rear concave part 52b of the second portion 52.

In FIG. 10, a power chamber 9 is defined by the rear side of the main part 51a of the first portion 51, the second portion 52, a seal cup 12, and the recessed portion of the plug 8. The seal cup 12, a seal cup 10, and a retainer 17 establish a fluid isolation of the power chamber 9 from a pressure chamber 7.

The front end of the main part 51a of the first portion 51 of the piston 5 and the rear concave part 52b of the second portion 52 of the piston 5 define a fluid chamber 101. The fluid chamber 101 is in fluid communication with the power chamber 9 by way of an axial blind bore 51c formed in the first portion 51, a radial hole 51d which connected to the blind bore 51d and the outer surface of the first portion 51, and a gap between the outer surface of the first portion 51 and the inner surface of the rear concave part 52.

A radial hole 52c is formed in the second part 52 to connect the front concave part 52c and the outer surface of the second part, 52. In the initial state shown in FIG. 10, the pressure chamber 7 is in fluid communication with a reservoir (not shown) by way of the front concave part 52a, the hole 52c, a hole 11a formed in the retainer 11, a hydraulic passage 1c formed in the cylinder body 1a, and a port 1d.

The other portions of the hydraulic pressure brake apparatus 1 in accordance with this embodiment of the present embodiment are the same as the corresponding portions of the first embodiment of the hydraulic pressure brake apparatus 1 and so a detailed description of such features will not be repeated.

The operation of the braking apparatus 1 in accordance with the second embodiment of the present invention is as follows, with reference being made to FIGS. 1–9 in connection with other parts of the hydraulic pressure brake apparatus 1 not shown in FIG. 10.

When the braking apparatus 1 is in its initial state, due to fact that the solenoid valve 50 is in closed condition, no fluid communication is established between the accumulator 200 and the power chamber 9 by way of the solenoid valve 50. On the other hand, the solenoid valve 60 is opened and so fluid communication is established between the power chamber 9 and the power output chamber 25 or the spool valve mechanism 21 by way of the solenoid valve 60.

When the ignition switch is turned on or closed, the electronic control device 90 begins to execute the program whose procedures are specified in the aforementioned flowcharts. Then, the microcomputer 90g is initialized to clear the variables to zeros. During a normal braking operation mode, when the driver applies a depression force to the brake pedal 4 having a magnitude of i1, the first portion 51 of the piston 5 is urged to thereby move the first portion 51 of piston 5 in the frontward direction relative to the cylinder body 1a.

Due to the fact that the front end of the first portion 51 is in abutment with the bottom wall of the rear concave part 52b of the second portion 52b, the second portion 52 is also brought into frontward movement by the first portion 51 which is being moved in the frontward movement. Thus, the first portion 51 and the second portion 52 of the piston 50 move as a unit in the frontward direction.

Due to the resulting frontward movement of the piston 5, the communication port 52c is closed by the seal cup 10, which interrupts the fluid communication between the pressure chamber 7 and the reservoir 100. Thus, the fluid or hydraulic pressure in the pressure chamber 7 is increased in accordance with further frontward movement of the piston 5 as the combination of the first portion 51 and the second portion 52.

The resulting increase of the hydraulic pressure in the pressure chamber 7 moves the control piston 6 and the spool 15 in the frontward direction relative to the cylinder body 1a, with the result that the spool valve mechanism 21 is closed and the poppet valve mechanism 23 is opened. Thus, the fluid communication between the regulating chamber 17 and the reservoir 100 is interrupted and the fluid communication between the accumulator 200 and the power chamber 9 is established.

The hydraulic powered-braking pressure applied from the accumulator 200 to the power chamber 9 acts on the rear side of the second portion 52 of the piston 50, which further moves the second portion 52 of the piston 50, thereby establishing a unitary movement of the second portion 52 and the first portion 51 which is applied with the depression force whose magnitude is i1.

The resultant or increased hydraulic pressure in the pressure chamber 7 is outputted, as a master cylinder hydraulic pressure, to the wheel cylinders Wfr, Wfl by way of the hydraulic pressure passage 1i and the actuator 40, so that the depending on the magnitude of the resultant hydraulic pressure, the wheel cylinders Wfr, Wfl apply braking forces to the wheels FR, FL, respectively. Thus, in accordance with the frontward movement of the piston 5 caused by the depression of the brake pedal 4, each of the wheels FR, FL is applied with a first braking force.

In addition, the powered hydraulic braking pressure is outputted from the power output chamber 25 to the wheel cylinders Wrr, Wrl by way of the hydraulic pressure passage 1j and the actuator 40, so that depending on the magnitude of the resultant powered hydraulic pressure, the wheel cylinders Wrr, Wrl apply braking forces to the wheels RR, RL, respectively. Thus, in accordance with the frontward movement of the piston 5 which is caused by the depression of the brake pedal 4, each of the wheels RR, RL is applied with a first braking force.

At this time, the magnitude of the hydraulic pressure applied to the front side wheel cylinders Wfr, Wfl is Pw1.

Other operations of the hydraulic pressure brake apparatus 1 according to the second embodiment of the present invention are not explained here as they are the same as those described above with respect to the first embodiment of the hydraulic pressure brake apparatus 1.

For example, while the vehicle is in cruise, a measured value K1 detected by the inter-vehicle distance sensor 120 is inputted to the electronic control device 90 and the measured value or distance K1 is compared to a predetermined or threshold value Kn in the electronic control device 90. If the measured distance K1 is found to be smaller than the threshold value Kn in the electronic control device 90, to avoid approaching the preceding vehicle too closely, the electronic control device 90 begins to establish an automatic braking operation mode to increase the inter-vehicle distance to not less than the threshold value Kn by activating the solenoid valves 50, 60. That is, without depressing the brake pedal 4, the hydraulic pressure braking apparatus 1 is initiated.

When the electronic control device 90 activates the solenoid valve 50, the accumulator 200 is brought into fluid communication with the power chamber 9 by way of the resultant solenoid valve 50, and when the electronic control device 90 activates the solenoid valve 60, the power chamber 9 is isolated from the power output chamber 25, the spool valve mechanism 21, and the regulating chamber 17. Thus, the brake fluid in the accumulator 200 enters the power chamber 9, thus increasing the hydraulic pressure in the power chamber 9.

At this time, the resulting hydraulic powered braking pressure acts only on the second portion 52 of the piston 50, while no depression force is applied to the first portion 51 of the piston 50 from the driver. As a result, only the second portion 52 of the piston 50 is moved in the frontward direction relative to both the cylinder body 1a and the first portion 51 of the piston 5. Thus, the first portion 51 of the piston 50 remains its initial position, thereby remaining the initial position of the brake pedal 4 unchanged which is interlocked with the first portion 51 of the piston 50.

Thus, independent of the depression of the brake pedal 4, the hydraulic powered braking force derived from the accumulator 200 moves the second portion 52 of the piston 5 in the frontward direction, thereby applying the second braking force to each of the wheels FR, FL, RR, RL.

The foregoing automatic braking operation mode applies the hydraulic braking pressure to move the second portion 52 of the piston 5 in the frontward direction to initiate or operate the hydraulic pressure brake apparatus 1 by using the accumulator 200 as a replacement of the driver's depression of the brake pedal 4.

While the automatic braking operation mode is being established, the relationship between the hydraulic powered braking pressure from the accumulator 200 to the power chamber 9 and the hydraulic braking pressure in the front side wheel cylinder Wfr/Wfl follows substantially the bent line depicted in FIG. 7. Thus, when the power chamber 9 is applied with the hydraulic powered braking pressure from the accumulator 200 which is equivalent to the depression force i1 applied to the brake pedal 4, the hydraulic pressure braking apparatus 1 applies the hydraulic pressure having a magnitude substantially Pw1 to the wheel cylinders Wfr, Wfl.

In addition, although the brake pedal 4 is interlocked with the piston 5 during the normal braking operation mode, such an interlocked relation is not maintained while the automatic braking operation mode is being established.

While the hydraulic pressure braking apparatus 1 is in operation in the automatic braking operation mode, if the hydraulic braking pressure applied to the front side wheel cylinder Wfr/Wfl is Pw2, for example, the brake pedal 4 moves through a distance or stroke of substantially St2 together with frontward movement of the second portion 52 of the piston 5. The stroke St2 of the second portion 52 of the piston 50 is equal to the stroke St2 of the piston 50 of the first embodiment.

While the hydraulic pressure braking apparatus 1 is in operation in the automatic braking operation mode, the second portion 52 of the piston 50 moves relative to the first portion 51 of the piston 50, thereby defining the fluid chamber 101 in the cylinder bore 1b of the cylinder body 1a as described above.

Under the resulting condition, if the brake pedal 4 is depressed by the driver with a force whose magnitude is, for example, (i2−i1) in order to increase the braking force, the first portion 51 of the piston 5 is moved in the frontward direction relative to the cylinder body 1a and the second portion 52 of the piston 50. During the frontward movement of the first portion 51 of the piston 50, the brake fluid in the fluid chamber 101 is compressed by the first portion 51 and the second portion 52 of the piston 50, and the resulting brake fluid enters the power chamber 9 by way of the holes 51c, 51d formed in the first portion 51 of the piston 50.

The orifice 51e provided in the hole 51d, which extends in the radial direction in the first portion 51 of the piston 50, restricts the flow of brake fluid to the power chamber 9 from the fluid chamber 101 and provides a restriction against the frontward movement of the first portion 51 of the piston 50.

The unitary movement of the first portion 51 and the second portion 52 of the piston 50 in the frontward direction increases the hydraulic pressure in the pressure chamber 7, thus closing the spool valve mechanism 21 and opening the poppet valve mechanism 23. The power chamber 9 is thus brought into fluid communication with the accumulator 200. At this time, due to the fact that the automatic brake operation mode closes the solenoid valve 60, the hydraulic powered braking pressure is applied from the power chamber 9 by way of the power input chamber 33, the power output chamber 25, the hydraulic pressure passage 1h, and the check valve 70.

Thus, a further forward movement of the piston 5 takes place, the hydraulic braking pressure in the pressure chamber 7 is further increased, the master cylinder hydraulic pressure is applied to the wheel cylinders Wfr, Wfl by way of the hydraulic pressure passage 1i and the wheel cylinders Wrr, Wrl are applied with the hydraulic powered braking pressure from the power output chamber 25 by way of the hydraulic pressure chamber 1j. The wheels cylinders Wfr, Wfl, Wrr, Wrl, depending on the forces applied thereto, apply the brake forces to the respective wheels FR, FL, RR, RL. In other words, the wheels FR, FL, RR, RL, which are being applied with the respective second brake forces by the automatic brake operation mode, are applied with the respective first forces additionally by the normal brake operation.

At this time, the piston 5 is applied with, as its promoting force, the sum of the depression force (i1–i2) from the driver and the hydraulic powered braking pressure whose magnitude is equivalent to the depression force i2. This means that such a condition is equivalent to when the depression force i1 is applied to the brake pedal 4 when the apparatus is in the normal brake operation mode. Thus, the front side wheel cylinders Wfr, Wfl are applied with the hydraulic brake force having a magnitude of Pw1.

In this operation, due to the fact that the brake pedal 4 and the piston 5 are depressed with a force (i1–i2) from the driver, after the engagement between the first portion 51 and the second portion 52 of the piston 50, the depression stroke of the brake pedal 4 becomes (St1–St2), which results in the stroke of the brake pedal 4 becoming St1 from its initial position. That is, in the noxnal brake operation mode, the brake pedal 4 has to be depressed through a stroke of St1 measured from its initial position so that the wheel cylinders Wfr and Wfl are applied with the hydraulic braking pressure whose magnitude is Pw1. By contrast, upon depression of the brake pedal 4 while the automatic brake operation mode is being established, the brake pedal 4 has to be depressed through a stroke of St1 measured from its initial position so that the wheel cylinders Wfr, Wfl are applied with the hydraulic braking pressure whose magnitude is Pw1.

Thus, if the same hydraulic braking pressure is applied to the wheel cylinder Wfr/Wfl, in both the normal brake operation mode and the depression of the brake pedal during the automatic brake operation mode, the brake pedal 4 stops at the same position upon depression thereof. This means that the depression stroke or the degree of depression of the brake pedal 4 becomes the same and so a good brake feeling is provided to the driver.

As explained above, in the hydraulic pressure brake apparatus 1 in accordance with the second embodiment of the present invention, when the hydraulic pressure brake apparatus 1 operates in the automatic brake operation mode, the initial position of the brake pedal 4 remains unchanged. The driver can thus depress the brake pedal 4 with the same feeling as when the apparatus is in the normal brake operation mode.

The piston 5 has the first portion 51 and the second portion 52 such that the first portion 51 is interlocked with the brake pedal 4. With this rather simple construction, the initial position of the brake pedal 4 remains unchanged while the apparatus 1 is in the automatic brake operation mode. This makes it possible to produce the apparatus 1 at a lower cost and through a relatively easy assembly.

While the apparatus 1 is in the automatic braking operation mode, until the establishment of the engagement between the first portion 51 and the second portion 52, the restriction acts on the first portion 51 which it is in advancing movement. This gives a suitable reaction to the driver who is depressing the brake pedal 4, thereby improving brake feeling provided to the driver.

With the simple structure that includes the orifice 51e, the first portion 51 of the piston 50 can be provided with a suitable resistive force, thus making it possible to provide the apparatus 1 at a lower cost through a simplified assembly process.

Figure 11:
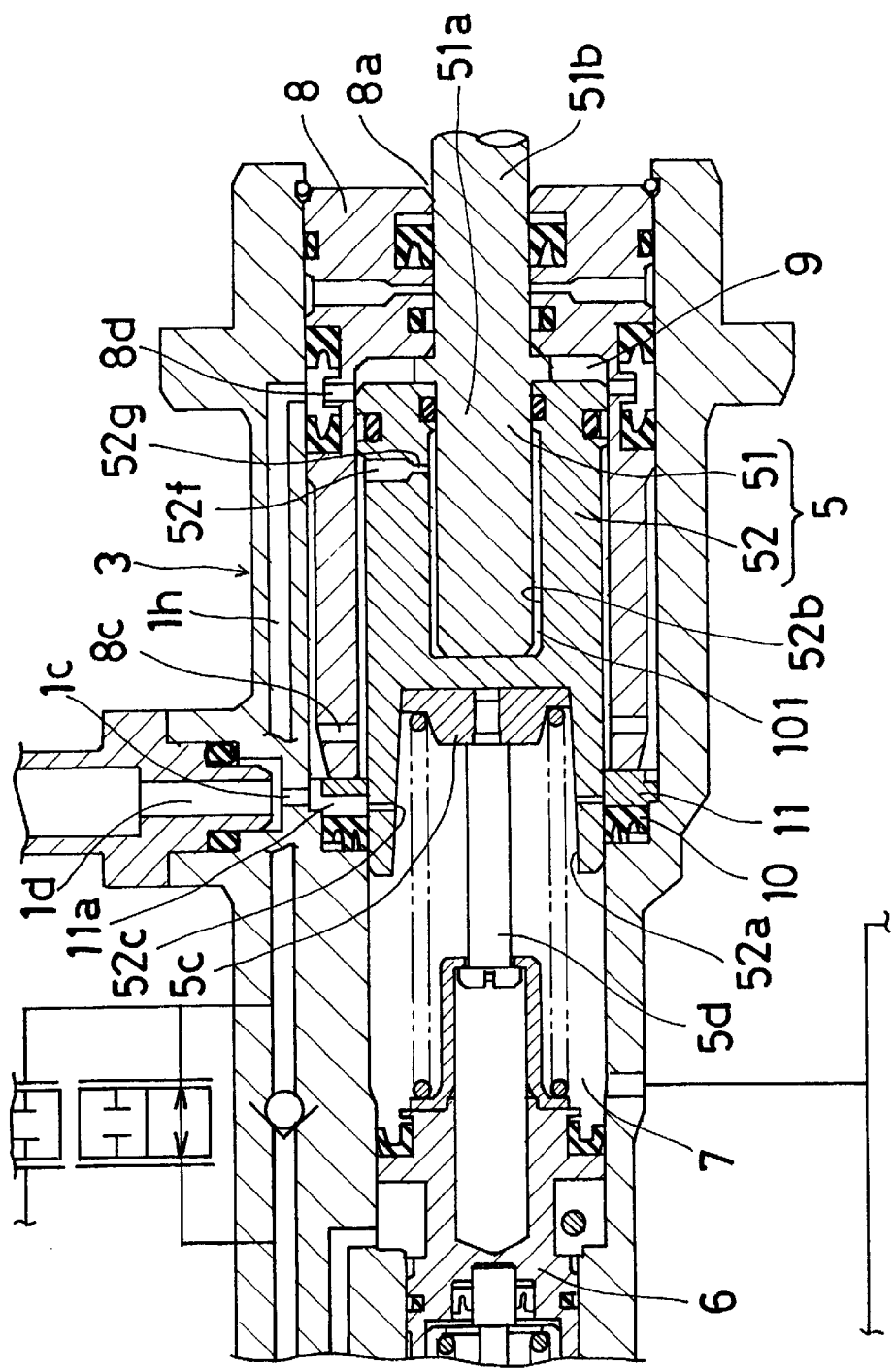
FIG. 11 is a vertical cross-sectional view of a master cylinder included in a brake apparatus in accordance with a third embodiment of the present invention.

FIG. 11 illustrates a master cylinder included in a hydraulic pressure brake apparatus 1 in accordance with a third embodiment of the present invention. Except for the piston, the hydraulic pressure brake apparatus 1 in accordance with the third embodiment is identical with the apparatuses 1 in accordance with the second embodiment and the first embodiment. In the third embodiment, features of the apparatus corresponding to those described above are designated with the same reference numeral.

As shown in FIG. 11, a piston 5 is fitted in a slidable manner in both a concave or recessed portion of a plug 8 and the cylinder bore 1b so as to be movable in the axial direction (i.e., the right and left direction in FIG. 11). The piston 5 is comprised of a first portion 51 and a second portion 52, with the second portion 52 being positioned at the front side (i.e., the left side in FIG. 11) of the first portion 51.

The first portion 51 of the piston 5 has a main part 51a from which an axial part 51b extends in the rearward direction (i.e., the right direction in FIG. 11). The axial part 51b passes though a hole 8a of the plug 8 in a fluid-tight manner and is connected to a brake pedal (not shown) outside the cylinder body 1a. An interlocked relationship exists between the brake pedal and the first portion 51 of the piston 5 so that when one of the brake pedal and the first portion 51 moves the other moves concurrently.

The second portion 52 of the piston 50 is formed at its axial ends with a front concave or recessed part 52a and a rear concave or recessed part 52b. The front recessed part 52a opens in the frontward direction and the rear recessed part 52b opens in the rearward direction. The main part 51a of the first portion 51 is fitted in the rear recessed part 52a of the second portion 52b so as to be movable tn the axial direction. Thus, one of the first portion 51 and the second portion 52 is movable relative to the other. When the hydraulic pressure brake apparatus 1 is in its initial state in which each element takes its initial position, the front end of the first portion 51 is in abutment with the bottom of the rear recessed part 52b.

A power chamber 9 is defined by the main part 51a of the first portion 51, the second portion 52, and the plug 8. The power chamber 9 is in fluid communication with a hydraulic pressure passage 1h by a hole 8d formed in the plug 8.

A fluid chamber 101 is defined in the recessed part 52b by the first portion 51 and the second portion 52 of the piston 5. The fluid chamber 101 is in fluid communication with a reservoir (not shown) by way of a radial hole 52f formed in the second portion 52, an annular gap between the outer surface of the first portion 51 and the inner surface of the rear recessed part 52b of the second portion 52, a radial hole 8a formed at the front portion of the plug 8, a hydraulic pressure passage 1c, and a port 1d.

The power chamber 9 is isolated from the fluid chamber 101 in a fluid-tight manner by way of an O-ring provided between the first portion 51 and the second portion 52 of the piston 5. Another O-ring mounted on the second portion 52 isolates the power chamber 9 from the reservoir.

The second portion 52 of the piston 5 is formed at its front portion with a radially extending hole 52c which extends between the outer surface of the second portion 52 and the front concave part 52a. At the initial state of the apparatus 1 as shown in FIG. 11, the pressure chamber 7 is in fluid communication with the reservoir by way of the front recessed part 52a of the second portion the hole 52c, a radial hole 11a formed in a retainer 11, a hydraulic pressure passage 1a, and the port 1d.

The operation of the braking apparatus 1 in accordance with the third embodiment of the present invention is as follows, with reference being made to FIGS. 1–9 in connection with other parts of the hydraulic pressure brake apparatus 1 not shown in FIG. 10. When the hydraulic pressure brake apparatus 1 is in its initial state, the solenoid valve 50 is in the closed condition and so fluid communication is not established between the accumulator 200 and the power chamber 9 by way of the solenoid valve 50. On the other hand, the solenoid valve 60 is opened and so fluid communication is established between the power chamber 9 and the power output chamber 25 or the spool valve mechanism 21 by way of the solenoid valve 60.

When the ignition switch is turned on or closed, the electronic control device 90 begins to execute the program whose procedures are specified in the flowcharts as mentioned above. Then, the microcomputer 90g is initialized, which clears the variables to zero. In the normal braking operation mode, when the driver applies a depression force to the brake pedal 4 having a magnitude of i1, the first portion 51 of the piston 5 is urged, thereby moving the first portion 51 of piston 5 in the frontward direction relative to the cylinder body 1a.

Due to the fact that the front end of the first portion 51 is in abutment with the bottom wall of the rear recessed part 52b of the second portion 52b and an outer flange of the first portion 51 is in engagement with the rear side of the second portion 52, the second portion 52 is also brought into frontward movement by the first portion 51 which is being moved in the frontward movement. Thus, the first portion 51 and the second portion 52 of the piston 50 thus move as a unit in the frontward direction.

Due to the resulting frontward movement of the piston 5, the communication port 52c is closed by the seal cup 10, thus interrupting the fluid communication between the pressure chamber 7 and the reservoir 100. Thus, the fluid or hydraulic pressure in the pressure chamber 7 is increased in accordance with further frontward movement of the piston 5 defined as the combination of the first portion 51 and the second portion 52.

The resulting increase of the hydraulic pressure in the pressure chamber 7 moves the control piston 6 and the spool 15 in the frontward direction relative to the cylinder body 1a, with the result that the spool valve mechanism 21 is closed and the poppet valve mechanism 23 is opened. Thus, the fluid communication between the regulating chamber 17 and the reservoir 100 is interrupted and the fluid communication between the accumulator 200 and the power chamber 9 is established.

The hydraulic powered braking pressure applied from the accumulator 200 to the power chamber 9 acts on the rear side of the second portion 52 of the piston 50, which further moves the second portion 52 of the piston 50, thereby establishing a unitary movement of the second portion 52 and the first portion 51 which is applied with the brake pedal depression force having a magnitude of i1.

The resultant or increased hydraulic pressure in the pressure chamber 7 is outputted, as a master cylinder hydraulic pressure, to the wheel cylinders Wfr, Wfl by way of the hydraulic pressure passage 1i and the actuator 40, with the result that depending on the magnitude of the resultant hydraulic pressure, the wheel cylinders Wfr, Wfl apply respective braking forces to the wheels FR, FL. Based on the frontward movement of the piston 5 caused by the depression of the brake pedal 4, each of the wheels FR, FL is applied with a first braking force.

In addition, the powered hydraulic braking pressure is outputted from the power output chamber 25 to the wheel cylinders Wrr, Wrl by way of the hydraulic pressure passage 1j and the actuator 40, with the result that depending on the magnitude of the resultant powered hydraulic pressure, the wheel cylinders Wrr, Wrl apply respective braking forces to the wheels RR, RL, respectively. Thus, based on the frontward movement of the piston 5 caused by the depression of the brake pedal 4, each of the wheels RR, RL is applied with a first braking force.

At this time, the magnitude of the hydraulic pressure applied to the front side wheel cylinders Wfr, Wfl is Pw1.

The other operations of the hydraulic pressure brake apparatus 1 according to the third embodiment of the present invention are not repeated in detail here as they are the same as those described above in connection wit the hydraulic pressure brake apparatus 1 according to the first embodiment of the present invention.

While the vehicle is in cruise, a measured value K1 detected by the inter-vehicle distance sensor 120 is inputted to the electronic control device 90, the measured value or distance K1 is compared to a predetermined or threshold value Kn in the electronic control device 90. If the measured distance K1 is found to be smaller than the threshold value Kn in the electronic control device 90, to avoid approaching the preceding vehicle too closely, the electronic control device 90 begins to establish an automatic braking operation mode to increase the inter-vehicle distance so that it is not less than the threshold value Kn by activating the solenoid valves 50, 60. That is, without depressing the brake pedal 4, the hydraulic pressure braking apparatus 1 is initiated.

When the electronic control device 90 activates the solenoid valve 50, the accumulator 200 is brought into fluid communication with the power chamber 9 by way of the solenoid valve 50, and when the electronic control device 90 activates the solenoid valve 60, the power chamber 9 is isolated from the power output chamber 25, the spool valve mechanism 21, and the regulating chamber 17. Thus, the brake fluid in the accumulator 200 enters the power chamber 9 to increase the hydraulic pressure in the power chamber 9.

At this time, the resulting hydraulic powered braking pressure acts only on the second portion 52 of the piston 50, while no depression force is applied to the first portion 51 of the piston 50 from the driver. As a result, only the second portion 52 of the piston 50 is moved in the frontward direction relative to the cylinder body 1a and the first portion 51 of the piston 5. Thus, the first portion 51 of the piston 50 remains in its initial position so that the initial position of the brake pedal 4 which is interlocked with the first portion 51 of the piston 50 is unchanged.

Thus, independent of the depression of the brake pedal 4, the hydraulic powered braking force derived from the accumulator 200 moves the second portion 52 of the piston 5 in the frontward direction, thereby applying the second braking force to each of the wheels FR, FL, RR, RL.

The foregoing automatic braking operation mode applies the hydraulic braking pressure to move the second portion 52 of the piston 5 in the frontward direction so as to initiate or operate the hydraulic pressure brake apparatus 1 by using the accumulator 200 as a replacement for the driver's depression of the brake pedal 4. While the automatic braking operation mode is being established, the relationship between the hydraulic powered braking pressure from the accumulator 200 to the power chamber 9 and the hydraulic braking pressure in the front side wheel cylinder Wfr/Wfl substantially follows the bent line depicted in FIG. 7. Thus, when the power chamber 9 is applied with the hydraulic powered braking pressure from the accumulator 200 which is equivalent to the depression force 11 applied to the brake pedal 4, the hydraulic pressure braking apparatus 1 applies the hydraulic pressure having a magnitude of substantially Pw1 to the wheel cylinders Wfr, Wfl.

In addition, although the brake pedal 4 is interlocked with the piston 5 during the normal braking operation mode, such an interlocked relationship is not maintained while the automatic braking operation mode is being established.

While the hydraulic pressure braking apparatus 1 is operating in the automatic braking operation mode, if the hydraulic braking pressure applied to the front side wheel cylinder Wfr/Wfl is Pw2, for example, the brake pedal 4 moves through a distance or stroke of substantially St2 together with the frontward movement of the second portion 52 of the piston 5. The stroke St2 of the second portion 52 of the piston 50 is equal to the stroke St2 of the piston 50 of the first embodiment.

While the hydraulic pressure braking apparatus 1 is operating in the automatic braking operation mode, the second portion 52 of the piston 50 moves relative to the first portion 51 of the piston 50, thereby defining the fluid chamber 101 in the cylinder bore 1b of the cylinder body 1a as described above. Under the resulting condition, if the brake pedal 4 is depressed by the driver with a force whose magnitude is, for example, (i2−i1) in order to increase the braking force, the first portion 51 of the piston 5 is moved in the frontward direction relative to the cylinder body 1a and the second portion 52 of the piston 50. During this frontward movement of the first portion 51 of the piston 50, the brake fluid in the fluid chamber 101 is compressed by the first portion 51 and the second portion 52 of the piston 50 and the resulting brake fluid enters the power chamber 9 by way of the hole 52f formed in the second portion 52, an annular gap between the inner surface of the plug 8 and the outer surface of the second portion 52, the hydraulic pressure passage 1c, and a port 1d.

The orifice 52g provided in the hole 52f in the second portion 52 of the piston 50 and extending in the radial direction restricts the flow of brake fluid to the power chamber 9 from the fluid chamber 101 and applies a restriction against the frontward movement of the first portion 51 of the piston 50.

The engagement between the first portion 51 and the second portion 52 initiates unitary movement of the first portion 51 and the second portion 52. At this time, the brake pedal 4 is depressed through a stroke of St2.

The unitary movement of the first portion 51 and the second portion 52 of the piston 50 in the frontward direction increases the hydraulic pressure in the pressure chamber 7, thus closing the spool valve mechanism 21 and opening the poppet valve mechanism 23. The power chamber 9 is thus brought into fluid communication with the accumulator 200. At this time, due to the fact that the automatic brake operation mode closes the solenoid valve 60, the hydraulic powered braking pressure is applied from the accumulator 200 to the power chamber 9 by way of the power input chamber 33, the power output chamber 25, the hydraulic pressure passage 1h, and the check valve 70.

Thus, further forward movement of the piston 5 occurs, the hydraulic braking pressure in the pressure chamber 7 is further increased, the master cylinder hydraulic pressure is applied to the wheel cylinders Wfr, Wfl by way of the hydraulic pressure passage 1i and the wheel cylinders Wrr, Wrl are applied with the hydraulic powered braking pressure from the power output chamber 25 by way of the hydraulic pressure chamber 1j. The wheels cylinders Wfr, Wfl, Wrr, Wrl, depending on the forces applied thereto, respectively, apply the brake forces to the respective wheels FR, FL, RR, RL.

In other words, the wheels FR, FL, RR, RL to which are applied the respective second brake forces by the automatic brake operation mode, are also applied with the respective first forces by the normal brake operation.

At this time, the piston 5 is applied with, as its promoting force, the sum of the depression force (i1−i2) from the driver and the hydraulic powered braking pressure whose magnitude is equivalent to the depression force i2. This means that such a condition is equivalent to when the depression force i1 is applied to the brake pedal 4 when the apparatus is in the normal brake operation mode. Thus, the front side wheel cylinders Wfr, Wfl are applied with the hydraulic brake force having a magnitude of Pw1.

In this operation, due to the fact that the brake pedal 4 and the piston 5 are depressed with a force (i1−i2) from the driver, after the engagement between the first portion 51 and the second portion 52 of the piston 50, the depression stroke of the brake pedal 4 becomes (St1−St2), which results in the stroke of the brake pedal 4 becoming St1 from its initial position. That is, in the normal brake operation mode, the brake pedal 4 has to be depressed through a stroke of St1 measured from its initial position so that the wheel cylinders Wfr, Wfl are applied with the hydraulic braking pressure having a magnitude of Pw1. In contrast, upon depression of the brake pedal 4 while the automatic brake operation mode is being established, the brake pedal 4 has to be depressed through a stroke of St1 as measured from its initial position so that the wheel cylinders Wfr, Wfl are applied with the hydraulic braking pressure having a magnitude of Pw1.

Thus, if the same hydraulic braking pressure is applied to the wheel cylinder Wfr/Wfl, in both the normal brake operation mode and when the brake pedal is depressed during the automatic brake operation mode, the brake pedal 4 stops at the same position upon depression. This means that the depression stroke or degree of depression of the brake pedal 4 is the same, thus making it possible to provide a good brake feeling to the driver.

Other features of this embodiment of the apparatus 1 of the present embodiments are the same as those of the apparatus 1 of the present invention described above.

Figure 12:
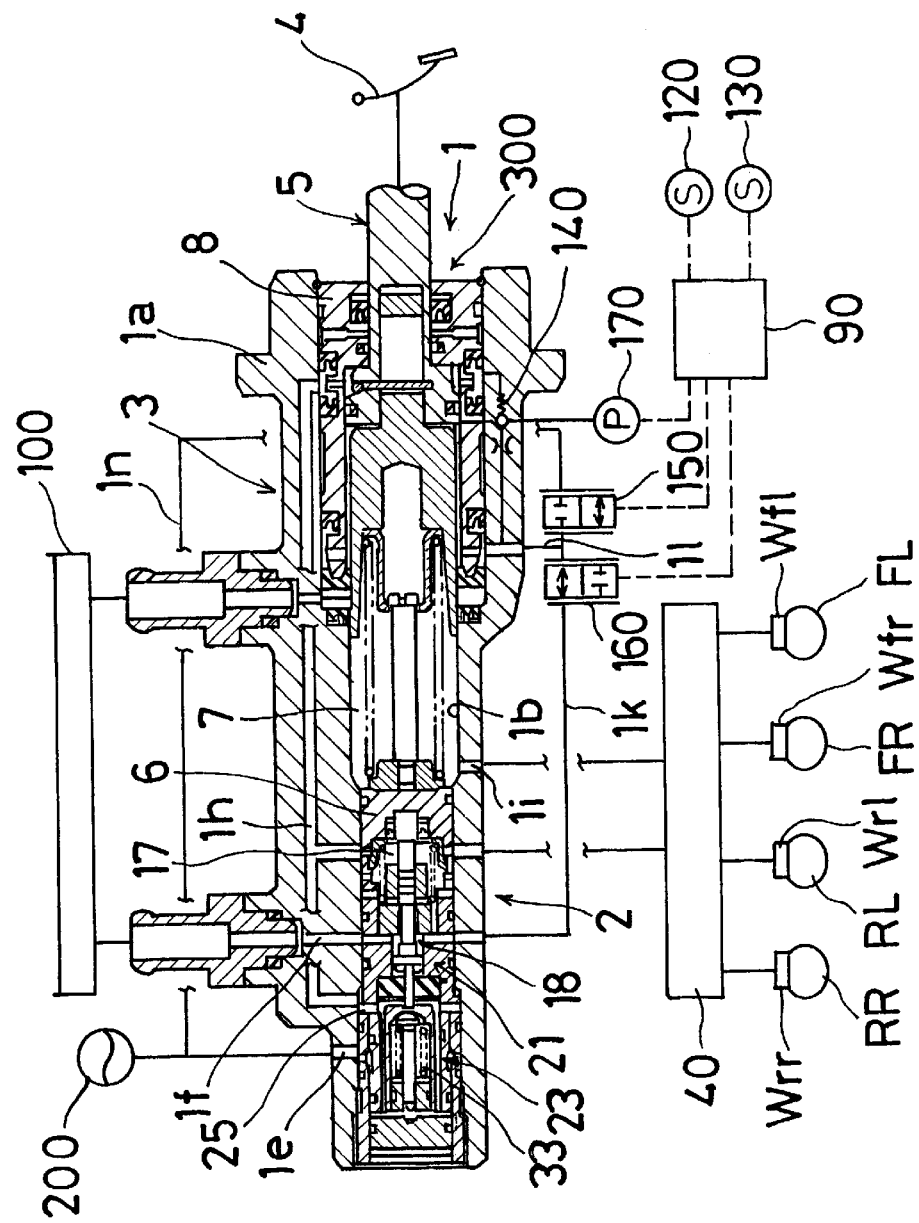
FIG. 12 is a vertical cross-sectional view of a brake apparatus in accordance with a third embodiment of the present invention.
Figure 13:
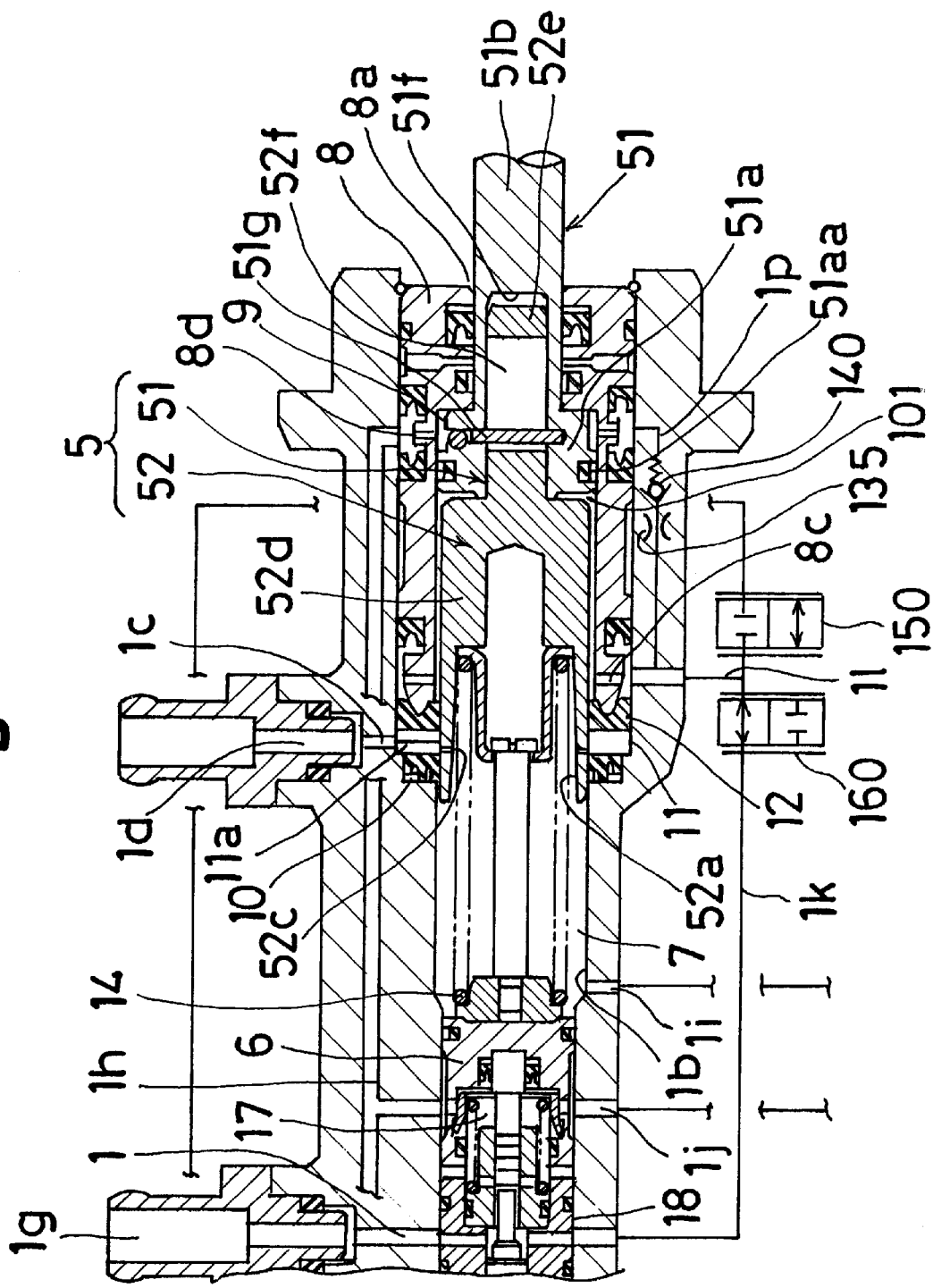
FIG. 13 is an enlarged vertical cross-sectional view of a master cylinder of the brake apparatus shown in FIG. 12.

FIG. 12 and FIG. 13 illustrate a hydraulic pressure brake apparatus 1 in accordance with a fourth embodiment of the present invention. Except for the booster 300, a relief valve 140, and several valves 150, 160, the hydraulic pressure brake apparatus 1 according to this embodiment is similar to the other embodiments described above. Thus, the following description will focus primarily on the booster 300, the relief valves 140, and the valves 150, 160. Feature in this embodiment that are similar to and correspond to features in the other embodiments described above are provided with like reference characters.

As shown in FIGS. 12 and 13, the hydraulic pressure brake apparatus 1 includes a cylinder body 1a. A hydraulic pressure regulator 2 is provided at the frontward side (i.e., the left side in FIG. 13) in the cylinder body 1a while the master cylinder 3 is provided in the rear side of the cylinder body 1a. A booster 300 provided with a brake pedal 4 is disposed at the rear side of the master cylinder 3.

A power piston 51 and a master cylinder piston 52 which together constitute a piston 5 are fitted in a slidable manner in both a recessed portion of a plug 8 and a cylinder bore 1b so as to be movable in the axial direction (i.e., the right and left direction in FIG. 12). The power piston 51 constitutes the booster 300, while the master cylinder piston 52 positioned at the front side (i.e., the left side in FIG. 13) of the power piston 51 constitutes the master cylinder 3.

The power piston 51 has a main part 51a from which an axial part 51b extends in the rearward direction (i.e., the right direction in FIG. 13). The axial part 51b passes though a hole 8a of the plug 8 in a fluid-tight manner and is connected to the brake pedal 4 outside the cylinder body 1a. An interlocked relationship exists between the brake pedal 4 and the power portion 51 so that when one of the brake pedal 4 and the power piston 51 moves the other also moves concurrently.

The master cylinder piston 52 is formed at its axial ends with a front concave or recessed part 52a and a rear projection 52e. The front recessed part 52a and opens in the frontward direction, while the rear projection 52e extends outwardly in the rearward direction. The rear projection 52e of the master cylinder piston 52 is movably fitted in a front concave or recessed portion 51f of the power piston 51 which opens in the frontward direction. Thus, one of the power piston 51 and the master cylinder piston 52 is movable relative to the other.

A longitudinal slot 52f is formed in the rearward projection 52 of the master cylinder piston 52. A pin 51g acting as a stopper passes through this slot 52f. When the pin 52g is brought into engagement with the rear end of the slot 52f, further frontward movement of the master cylinder piston 52 relative to the power piston 51 is regulated or prevented.

When the hydraulic pressure brake apparatus 1 is in its initial state as shown in FIG. 13 in which each element takes its initial position, the front end of the power piston 51 is in abutment with the rear side of main part 5d of the master cylinder piston 52, which determines a retracting limit of the power piston 51.

A power chamber 9 is defined by a land portion 51aa formed on the main part 51a of the power piston 51, a bottom of the main part 51a, and the plug 8. The power chamber 9 is in fluid communication with a hydraulic pressure passage 1h by way of a hole 8d formed in the plug 8.

A fluid chamber 101 serving as a pressure chamber is defined in the recessed part 52b by the main part 51a of the power piston 51, the main part 52a of the master cylinder piston 52, a seal cup 12, and the plug 8. The fluid chamber 101 is in fluid communication with an accumulator 200 by way of a radial hole 8c formed in the plug 8, a hydraulic pressure passage 1l, the solenoid valve 150, and a hydraulic pressure passage 1n. The fluid chamber 101 is also in fluid communication with the reservoir 100 by way of the hole 8c, the hydraulic pressure passage 1l, the solenoid valve 160, a hydraulic pressure passage 1k, a drain chamber 18, a hydraulic pressure passage 1f, and a port 1g.

The power chamber 9 is isolated from the fluid chamber 101 in a fluid-tight manner by way of an O-ring provided at the land portion 51aa of the power piston 51. The fluid chamber 101 is isolated from the pressure chamber 7 in a fluid-tight manner by way of the seal cup 10, the retainer 11, and the seal cup 12.

The master cylinder piston 52 is formed at its front portion with a radially extending hole 52c which extends between the outer surface of the master cylinder piston 52 and the front recessed part 52a. At the initial state of the apparatus 1 as shown in FIG. 13, the pressure chamber 7 is in fluid communication with the reservoir 100 by way of the front recessed part 52a of the master cylinder piston 52, the hole 52c, a radial hole 11a formed in the retainer 11, a hydraulic pressure passage 1c, and the port 1d.

A hydraulic pressure passage 11 and a hydraulic pressure passage 1p which is in fluid communication with the power chamber 9 are formed in the cylinder body 1a. The hydraulic pressure passage 1p is provided with an orifice 135 and a relief valve 140 which only allow one-way fluid flow from the hydraulic pressure passage 11 to the power chamber 9. The orifice 135 and the relief valve 140 are arranged in series. The regulating chamber 17 is in fluid communication with an actuator 40.

The solenoid valve 150, which is in the form of a normally closed type solenoid valve, establishes and interrupts fluid communication between the pressure chamber 101 and the accumulator 200. The solenoid valve 160, which is in the form of a normally opened type, establishes and interrupts fluid communication between the pressure chamber 101 and the reservoir 100. The solenoid valve 160 and the solenoid valve 150 constitute a first valve and a second valve, respectively. Each of the solenoid valves 150, 160 is controlled in linear mode in such a manner that the degree of opening of the valves 150, 160 varies with the amount of current applied to the valves.

A pressure sensor 170, which serves for determining the hydraulic pressure in the pressure chamber 101, feeds a signal indicating the pressure to an electronic control device 90. The valve 150, the valve 160, and the pressure sensor 170 are electrically wired to the electronic control device 90.

The operation of the braking apparatus 1 according to this fourth embodiment of the present invention is as follows, with reference being made to FIGS. 1–9 in connection with other parts of the hydraulic pressure brake apparatus 1 not shown in FIGS. 12 and 13.

When the hydraulic pressure brake apparatus 1 is in its initial state, due to fact that the solenoid valve 150 is in the closed condition, no fluid communication is established between the accumulator 200 and the pressure chamber 101 by way of the solenoid valve 150. On the other hand, the solenoid valve 160 is opened and so fluid communication is established between the pressure chamber 101 and both the drain chamber 18 and the reservoir 100 by way of the solenoid valve 160.

When the ignition switch is turned on or closed, the electronic control device 90 begins to execute the program according to the aforementioned flowcharts. Then, the microcomputer 90g is initialized, which clears the variables to zero. In the normal braking operation mode, when the driver applies depresses the brake pedal 4 with a depression force having a magnitude of i1, the power piston 51 is moved in the frontward direction relative to the cylinder body 1a.

Due to the fact that the front end of the power piston 51 is in abutment with the master cylinder piston 52, the master cylinder piston 52 is also brought into frontward movement. Thus, the power piston 51 and the master cylinder piston 52 move together as a unit in the frontward direction.

As a result of the concurrent frontward movements of the pistons 51 and 52, the outside of the communication port 52o of the master cylinder piston 52 is closed by the seal cup 10. This interrupts the fluid communication between the pressure chamber 7 and the reservoir 100. Thus, the fluid or hydraulic pressure in the pressure chamber 7 is increased in accordance with further frontward movement of the master cylinder piston 52.

The resulting increase of the hydraulic pressure in the pressure chamber 7 moves the control piston 6 and the spool 15 in the frontward direction relative to the cylinder body 1a. This frontward movement of the spool 15 establishes closure between the outer surface of the spool 15 and the hole 19 of the sleeve 19, with the result that the fluid communication between the regulating chamber 17 and the reservoir 100 is cut off.

Simultaneously, the frontward movement of the spool 15 causes frontward movement of the plunger and the valve body 29, thus causing the valve body 29 to move away from the valve seat 28d. Then, the hydraulic powered pressure is applied from the accumulator 200 to the regulating chamber 17 by way of the hydraulic pressure passage 1e, the hole 16c, the power input chamber 33, the clearance between the valve body 29 and the valve seat 28d, the hole 28c, the power output chamber 25, the hole 16b, and the hydraulic pressure chamber 1h. In addition, this hydraulic powered pressure is also applied to the power chamber 9 from the hydraulic pressure passage 1h by way of the hole 8d of the plug 8 with the result that the pressure in the power chamber 9 increases to assist in movement of the power piston 51.

Further forward movements of the power piston 51 and the master cylinder piston 52 causes the hydraulic pressure in the pressure chamber 7 to increase. The resulting or increased hydraulic pressure in the pressure chamber 7 is outputted, as a master cylinder hydraulic pressure, to the wheel cylinders Wfr, Wfl by way of the hydraulic pressure passage 1i and the actuator 40. Depending on the magnitude of the resulting hydraulic pressure, the wheel cylinders Wfr, Wfl apply respective braking forces to the wheels FR, FL. Thus, according to the frontward movement of the piston 5 which is caused by the depression of the brake pedal 4, each of the wheels FR, FL is applied with a first braking force.

In addition, the powered hydraulic powered braking pressure is outputted from the power output chamber 25 to the wheel cylinders Wrr, Wrl by way of the hydraulic pressure passage 1j and the actuator 40. As a result, depending on the magnitude of the resulting hydraulic powered braking pressure, the wheel cylinders Wrr, Wrl apply braking forces to the wheels RR, RL, respectively. Thus, according to the frontward movement of the pistons 5 caused by the depression of the brake pedal 4, each of the wheels RR, RL is applied with a first braking force.

At this time, the magnitude of the hydraulic pressure applied to each of the front side wheel cylinders Wfr, Wfl is Pw1.

Other operations of the hydraulic pressure brake apparatus 1 according to the fourth embodiment of the present invention are not explained in detail here as they are identical to those of the hydraulic pressure brake apparatus 1 according to the embodiments described above.

While the vehicle is in cruise, a measured value K1 which is detected by the inter-vehicle distance sensor 120 is inputted to the electronic control device 90. The measured value or distance K1 is compared to a predetermined or threshold value Kn in the electronic control device 90. If the measured distance K1 is found to be smaller than the threshold value Kn in the electronic control device 90, to avoid approaching the preceding vehicle too closely, the electronic control device 90 begins to establish an automatic braking operation mode to cause the inter-vehicle distance to be not less than the threshold value Kn by activating the solenoid valves 150, 160. That is, without depressing the brake pedal 4, the hydraulic pressure braking apparatus 1 is initiated.

When the electronic control device 90 activates the solenoid valve 150, the accumulator 200 is brought into fluid communication with the fluid chamber 101 by way of the solenoid valve 150, and when the electronic control device 90 activates the solenoid valve 160, the fluid chamber 101 is isolated from the drain chamber 18 and the reservoir 100. Thus, the brake fluid in the accumulator 200 enters the fluid chamber 101, which increases the hydraulic pressure in the fluid chamber 101. As a result the master cylinder piston 52 is moved in the frontward direction relative to the cylinder body 1a and the power piston 51, thereby establishing a brake force application to each wheel similar to the foregoing normal brake operation mode.

The electronic control device 90 calculates an ideal deceleration which is required for making the inter-vehicle distance not less than the threshold value Kn on the basis of the results of the inter-vehicle distance sensor 120 and the vehicle speed sensor 130. To apply braking forces to the wheels FR, FL, RR, RL which are essential for realizing the ideal deceleration, the amount of current applied to the solenoid valve 150 is controlled for adjusting the opening degree of the solenoid valve 150. This results in an adjustment of the hydraulic powered braking pressure applied from the accumulator 200 to the fluid chamber 101.

If a result K2 which is issued most recently from the inter-vehicle sensor 120 is found to be greater than the threshold value Kn after being compared to the threshold value Kn, the current inter-vehicle distance is regarded as a sufficient one, thereby deactivating the solenoid valve 150. That is, the solenoid valve 150 is turned off or closed, which results in the fluid communication between the accumulator 200 and the fluid chamber 101 being interrupted.

The electronic control device 90 calculates another ideal deceleration which is required for terminating the automatic braking operation mode. In order to attain the calculated deceleration, the braking force applied to each of the wheels FR, FL, RR, RL is decreased. Such a pressure decrease is achieved through an adjustment of the hydraulic pressure in the fluid chamber 101 by controlling an opening area of the solenoid valve 160 which results from adjusting the amount of current applied to the solenoid valve 160.

When the solenoid valve 160 is opened, the fluid chamber 101 is brought into fluid communication with the reservoir 100 by way of the hydraulic pressure passage 1l, the solenoid valve 160, the hydraulic pressure passage 1k, the drain chamber 18, the hydraulic pressure passage 1f, and the port 1g. As a result, the hydraulic braking pressure in the fluid chamber 101 is decreased. Thus, similar to the foregoing return movement of the master cylinder piston 52 in the normal braking operation mode, the master cylinder piston 52 is returned to its initial position or state by being urged by the spring 14. Thus, the braking force is applied to each of the wheels FR, FL, RR, RL is decreased.

Immediately when the sensor 170 indicates that the hydraulic powered braking pressure in the fluid chamber 101 becomes substantially zero, the electronic control device 90 turns off the solenoid valve 160, which returns the hydraulic pressure brake apparatus 1 to its initial state.

This automatic braking operation mode applies hydraulic braking pressure to move the master cylinder piston 52 in the frontward direction to initiate or operate the hydraulic pressure brake apparatus 1 by using the accumulator 200 as an alternative for the driver's depression of the brake pedal 4. While the automatic braking operation mode is being established, the relationship between the hydraulic powered braking pressure from the accumulator 200 to the fluid chamber 101 and the hydraulic braking pressure in the front side wheel cylinder Wfr/Wfl substantially follows the bent line depicted in FIG. 7. Thus, when the fluid chamber 101 is supplied with hydraulic powered braking pressure from the accumulator 200 which is equivalent to the depression force i1 applied to the brake pedal 4, the hydraulic pressure brake apparatus 1 applies the hydraulic pressure whose magnitude is substantially Pw1 to the wheel cylinders Wfr, Wfl.

In addition, while the automatic braking operation mode is being established, the forward movement of the master cylinder piston 52 relative to the power piston 51 is restricted or interrupted immediately when the rear end of the longitudinal slot 52f formed in the master cylinder piston 52 is brought into engagement with the pin 51g of the power piston 51. As a result, the maximum point of the hydraulic braking pressure under increase is defined.

The interlocking relationship between the brake pedal 4 and the master cylinder piston 52 is established when the apparatus 1 is in the normal brake operation mode. However, in the automatic brake operation mode, the apparatus 1 fails to establish such an interlocking relationship between the brake pedal 4 and the master cylinder piston 52.

While the hydraulic pressure brake apparatus 1 is in operation in the automatic braking operation mode, if the hydraulic braking pressure applied to the front side wheel cylinder Wfr/Wfl is Pw2, for example, the brake pedal 4 moves through a distance or stroke of substantially St2 together with the frontward movement of master cylinder piston 52.

Under the resulting condition, if the brake pedal 4 is depressed by the driver with a force whose magnitude is, for example, (i2–i1) in order to increase the brake force, the power piston 51 is moved in the frontward direction relative to the cylinder body 1a and the master cylinder piston 52. The resultant hydraulic braking pressure flows into the power chamber 9 by way of the hole 8c formed in the plug 8 and the hydraulic pressure passage 1p provided therein with the orifice 135 and the relief valve 140.

Providing the orifice 135 in the hydraulic pressure passage 1p provides suitable restriction on the flow of the brake fluid from the fluid chamber 101 to the power chamber 9 which leads to application of a resistive force to the power piston 51 which is undergoing frontward movement.

Immediately when the power piston 51 is brought into engagement with the master cylinder piston 52, unitary frontward movement of the power piston 51 and the master cylinder piston 52 begins. At this time, the depressed stroke of the brake pedal 4 measured from its initial position becomes St2.

This unitary frontward movement of the power piston 51 and the master cylinder piston 52 brings about an increase of the hydraulic braking pressure in the pressure chamber 7, closing the spool valve mechanism 21, and opening the poppet valve mechanism 23. As a result, fluid communication is established between the accumulator 200 and the power chamber 9.

Thus, further forward movements of the power piston 51 and the master cylinder piston 52 occur, which results in the hydraulic braking pressure in the pressure chamber 7 being further increased. Then, the master cylinder hydraulic pressure is applied to the wheel cylinders Wfr, Wfl by way of the hydraulic pressure passage 1i and the wheel cylinders Wrr, Wrl are supplied with the hydraulic powered braking pressure from the power output chamber 25 by way of the hydraulic pressure chamber 1j. The wheels cylinders Wfr, Wfl, Wrr, Wrl, depending on the forces applied thereto, respectively, apply braking forces to the respective wheels FR, FL, RR, RL.

In other words, the wheels FR, FL, RR, RL which are being applied with the respective second brake forces by the automatic brake operation mode are also applied with the respective first forces by the normal brake operation.

At this time, the master cylinder piston 52 is applied with, as its promoting force, the sum of the depression force (i1–i2) from the driver and the hydraulic powered braking pressure whose magnitude is equivalent to the depression force i2. This means that such a condition is equivalent to the depression force i1 applied to the brake pedal 4 when the apparatus is in the normal brake operation mode. Thus, the front side wheel cylinders Wfr, Wfl are applied with the hydraulic brake force whose magnitude is Pw1.

In this operation, the brake pedal 4 and the master cylinder piston 52 are applied with a force whose magnitude is (i1–i2) which results in the stroke of the brake pedal 4 becoming (St1–St2) after engagement between the power piston 51 and the master cylinder piston 52. Thus, the depression stroke of the brake pedal 4 from its initial position becomes St1. That is to say, in the normal brake operation mode, the brake pedal 4 has to be depressed through a stroke of St1 measured from its initial position so that the wheel cylinders Wfr, Wfl are applied with the hydraulic braking pressure whose magnitude is Pw1. By contrast, upon depression of the brake pedal 4 while the automatic brake operation mode is being established, the brake pedal 4 has to be depressed through a stroke of St1 as measured from its initial position so that the wheel cylinders Wfr, Wfl are applied with the hydraulic braking pressure whose magnitude is Pw1.

Thus, if the same hydraulic braking pressure is applied to the wheel cylinder Wfr/Wfl, in both the normal brake operation mode and the depression of the brake pedal during the automatic brake operation mode, the brake pedal 4 stops at the same position upon depression thereof which means that the depression stroke or degree of depression of the brake pedal 4 becomes the same. This makes it possible to provide good brake feeling to the driver.

As explained above, the hydraulic pressure brake apparatus 1 in accordance with the present embodiment, while in the automatic brake operation mode, allows application of hydraulic braking pressures to the wheels FR, FL, RR, RL by providing the hydraulic powered braking pressure from the accumulator 200 to the fluid chamber 103. Like in the normal brake operation mode, in the automatic brake operation mode fluid communication is established between the regulating chamber 7 and the power chamber 9 when the brake pedal 4 is depressed, but no check valve 70 is required as in the other embodiments. Thus, the hydraulic pressure brake apparatus 1 according to the present embodiment is of a more simplified structure and permits realization of cost reductions.

The fluid communication between the fluid chamber 101 and the relief valve 140 allows, after the frontward movement of the master cylinder piston 52 relative to the power piston 51, the power piston 51 to move in the frontward direction relative to the master cylinder piston 52, thereby providing good brake feeling to the driver.

Providing the orifice 135 in the hydraulic pressure passage 1p offers the resistive force to the power piston 51 during frontward movement relative to the master cylinder piston 52. this makes it possible to provide good brake feeling to the driver.

The capability of adjusting the amount of frontward movement makes it possible to set the maximum limit of the hydraulic braking pressure in the pressure chamber 7 while the hydraulic pressure brake apparatus 1 is in the automatic brake operation mode.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A hydraulic pressure brake apparatus comprising:
    a pressure source;
    a regulator for regulating pressure in the pressure source to a regulated pressure corresponding to an operation force of a brake pedal to supply the regulated pressure to a power chamber during operation of the brake pedal, the regulator including a pressure increasing valve which alternatively establishes and interrupts fluid communication between the pressure source and the power chamber and a pressure decreasing valve which alternatively establishes and interrupts fluid communication between the power chamber and a reservoir;
    a booster including a power piston operated by the regulated pressure in the power chamber;
    a master cylinder associated with at least one wheel brake and interlocked with the booster; and
    valve means for applying the pressure in the pressure source to the power chamber irrespective of operation of the brake pedal, the valve means including a first valve alternatively establishing and interrupting fluid communication between the power chamber and the pressure decreasing valve and a second valve alternatively establishing and interrupting fluid communication between the power chamber and the pressure source.

2. The hydraulic pressure brake apparatus as set forth in claim 1, wherein the power piston of the booster is interlocked with the brake pedal.

3. The hydraulic pressure brake apparatus as set forth in claim 1, wherein the power piston is divided into a first portion and a second portion, the first portion being interlocked with the brake pedal, the second portion being movable relative to the first portion by the regulated pressure in the power chamber, and only the second portion being movable when the fluid communication between the power chamber and the pressure source is established by the second valve.

4. The hydraulic pressure brake apparatus as set forth in claim 3, wherein a check valve is arranged in parallel to the first valve between the power chamber and the pressure decreasing valve, the check valve only permitting flow fluid from the pressure decreasing valve into the power chamber.

5. The hydraulic pressure brake apparatus as set forth in claim 3, wherein a fluid chamber is defined between the first portion of the power piston and the second portion of the power piston, the fluid chamber being in fluid communication with one of the power chamber and the reservoir by way of an orifice.

6. The hydraulic pressure brake apparatus as set forth in claim 3, wherein after the movement of the second portion of the power piston which is successive to establishment of fluid communication between the power chamber and the pressure source by the second valve while the brake pedal is not being depressed, a resistive force is applied to the brake pedal.

7. The hydraulic pressure brake apparatus as set forth in claim 1, wherein at least one of the first valve and the second valve is in the form of a linear control type solenoid valve.

8. The hydraulic pressure brake apparatus as set forth in claim 1, including control means for controlling operation of the first valve and the second valve.

9. The hydraulic pressure brake apparatus as set forth in claim 8, wherein the control means controls the first valve and the second valve based on a vehicle condition.

10. A hydraulic pressure brake apparatus comprising:
    a pressure source;
    a regulator for regulating pressure in the pressure source to a regulated pressure corresponding to an operation force of a brake pedal to supply the regulated pressure to a power chamber during operation of the brake pedal, the regulator including a pressure increasing valve which alternatively establishes and interrupts fluid communication between the pressure source and the power chamber and a pressure decreasing valve which alternatively establishes and interrupts fluid communication between the power chamber and a reservoir;
    a booster including a power piston operated by the regulated pressure in the power chamber;
    a master cylinder associated with at least one wheel brake and interlocked with the booster, the master cylinder including a master cylinder piston adapted to be interlocked with the power piston, and a pressure chamber defined between the master cylinder piston and the power piston; and
    valve means for applying the pressure in the pressure source to the pressure chamber irrespective of operation of the brake pedal to operate the master cylinder piston, the valve means including a first valve alternatively establishing and interrupting fluid communication between the pressure chamber and the pressure decreasing valve and a second valve alternatively establishing and interrupting fluid communication between the pressure chamber and the pressure source.

11. The hydraulic pressure brake apparatus as set forth in claim 10 wherein the power piston of the booster is interlocked with the brake pedal and the master cylinder piston is movable relative to the power piston by the pressure applied to the pressure chamber irrespective of operation of the brake pedal by the valve means.

12. The hydraulic pressure brake apparatus as set forth in claim 11, wherein the pressure chamber is in fluid communication with the power chamber by way of a relief valve.

13. The hydraulic pressure brake apparatus as set forth in claim 10, wherein the pressure chamber is in fluid communication with the power chamber by way of a relief valve.

14. The hydraulic pressure brake apparatus as set forth in claim 13, wherein the relief valve is provided with an in-series orifice.

15. The hydraulic pressure brake apparatus as set forth in claim 11, wherein movement of the master cylinder piston is restricted when the second valve establishes fluid communication between the pressure chamber and the pressure source.

16. The hydraulic pressure brake apparatus as set forth in claim 10, wherein movement of the master cylinder piston is restricted when the second valve establishes fluid communication between the pressure chamber and the pressure source.

17. The hydraulic pressure brake apparatus as set forth in claim 10, wherein at least one of the first valve and the second valve is in the form of a linear control type solenoid valve.

18. The hydraulic pressure brake apparatus as set forth in claim 10, including control means for controlling operation of the first valve and the second valve.

19. The hydraulic pressure brake apparatus as set forth in claim 18, wherein the control means controls the first valve and the second valve based on a vehicle condition.

* * * * *

UNITED STATES PATENT AND TRADEMARK OFFICE
CERTIFICATE OF CORRECTION

PATENT NO.    : 6,276,136 B1
DATED         : August 21, 2001
INVENTOR(S)   : Masaki Oishi et al.

It is certified that error appears in the above-identified patent and that said Letters Patent is hereby corrected as shown below:

<u>Title page,</u>
The following information is to be added:

[30]    Foreign Application Priority Data

Jan. 28, 1999    (JP) .................................11-19861

Signed and Sealed this

Twenty-sixth Day of March, 2002

Attest:

JAMES E. ROGAN
*Attesting Officer*    *Director of the United States Patent and Trademark Office*